(12) United States Patent
Ponzio et al.

(10) Patent No.: US 8,230,585 B2
(45) Date of Patent: Jul. 31, 2012

(54) METHOD AND APPARATUS FOR WIRE TERMINATION ON OUTWARDLY SPOOLED MULTI-POLE STATORS

(75) Inventors: Massimo Ponzio, Barberino V. Elsa (IT); Roberto Giachetti, Florence (IT)

(73) Assignee: ATOP S.p.A., Barberino Val d'Elsa, Florence (IT)

( * ) Notice: Subject to any disclaimer, the term of this patent is extended or adjusted under 35 U.S.C. 154(b) by 0 days.

(21) Appl. No.: 12/889,626

(22) Filed: Sep. 24, 2010

(65) Prior Publication Data
US 2011/0131795 A1    Jun. 9, 2011

Related U.S. Application Data

(63) Continuation of application No. 11/787,191, filed on Apr. 12, 2007, now abandoned, which is a continuation of application No. 11/078,459, filed on Mar. 11, 2005, now abandoned, which is a continuation of application No. 10/406,471, filed on Apr. 3, 2003, now abandoned.

(30) Foreign Application Priority Data

Apr. 10, 2002 (EP) .................................. 02425221

(51) Int. Cl.
*H01F 7/06* (2006.01)
(52) U.S. Cl. ............. 29/605; 29/596; 29/564.5; 29/606; 242/433.1; 310/49.02
(58) Field of Classification Search ............ 29/596, 29/564.5, 605, 606; 242/432, 433, 433.1; 310/49.02, 49.27
See application file for complete search history.

(56) References Cited

U.S. PATENT DOCUMENTS

| 3,628,229 | A | | 12/1971 | Biddison et al. |
| 4,817,256 | A | | 4/1989 | Riti et al. |
| 4,826,092 | A | * | 5/1989 | Tsugawa ................... 242/433.4 |
| 4,830,297 | A | | 5/1989 | Walton et al. |
| 5,413,403 | A | | 5/1995 | Beakes et al. |
| 6,615,479 | B2 | | 9/2003 | Hiei |
| 6,732,970 | B2 | | 5/2004 | Dolgas et al. |
| 6,902,132 | B2 | | 6/2005 | Becherucci et al. |

FOREIGN PATENT DOCUMENTS
WO    WO 97/42698    11/1997

* cited by examiner

*Primary Examiner* — A. Dexter Tugbang
*Assistant Examiner* — Jeffrey T Carley
(74) *Attorney, Agent, or Firm* — Ropes and Gray LLP; Jeffrey H. Ingerman

(57) ABSTRACT

A method and device for wire termination on stators (1) wherein the wire (15) is wound about poles (6) distributed by a flyer (10), guided by shrouds (16) that move radially with respect to the stator (1) overlapping the respective pole (6). Wire termination operations are provided on the wire ends (15) into the terminals (4) with the aid of the flyer (10), carried out by an apparatus equipped with a termination device (20), comprising a first deflector (21), a second deflector (22), a blade (23), and a clamp formed by a movable gripper (24) and a fixed gripper (25). The movable gripper is suitable for closing onto the fixed gripper for gripping the wire (15). The device (20) can carry out the steps of catching, moving, introducing and cutting the wire (15) with movements parallel to its own axis (27), or to the axis (7) of the stator (1).

10 Claims, 18 Drawing Sheets

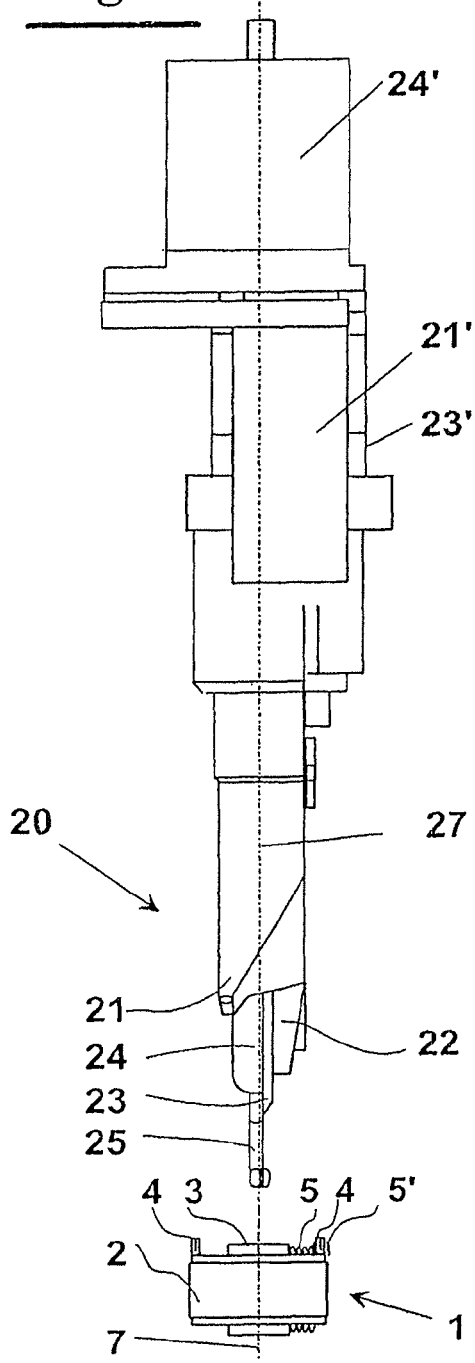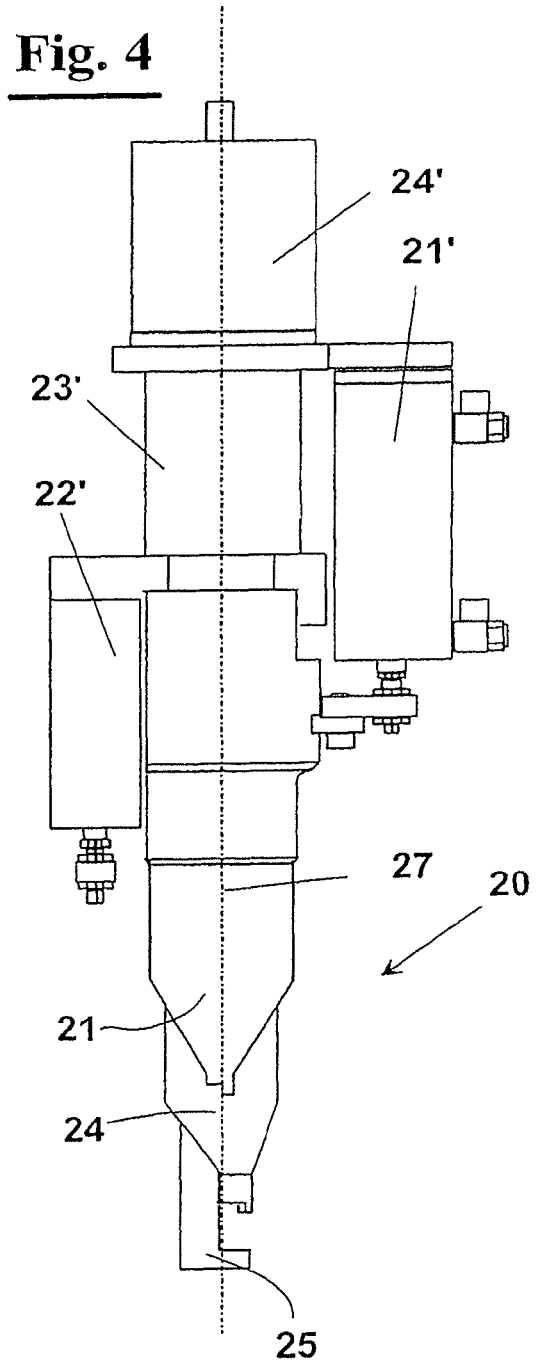

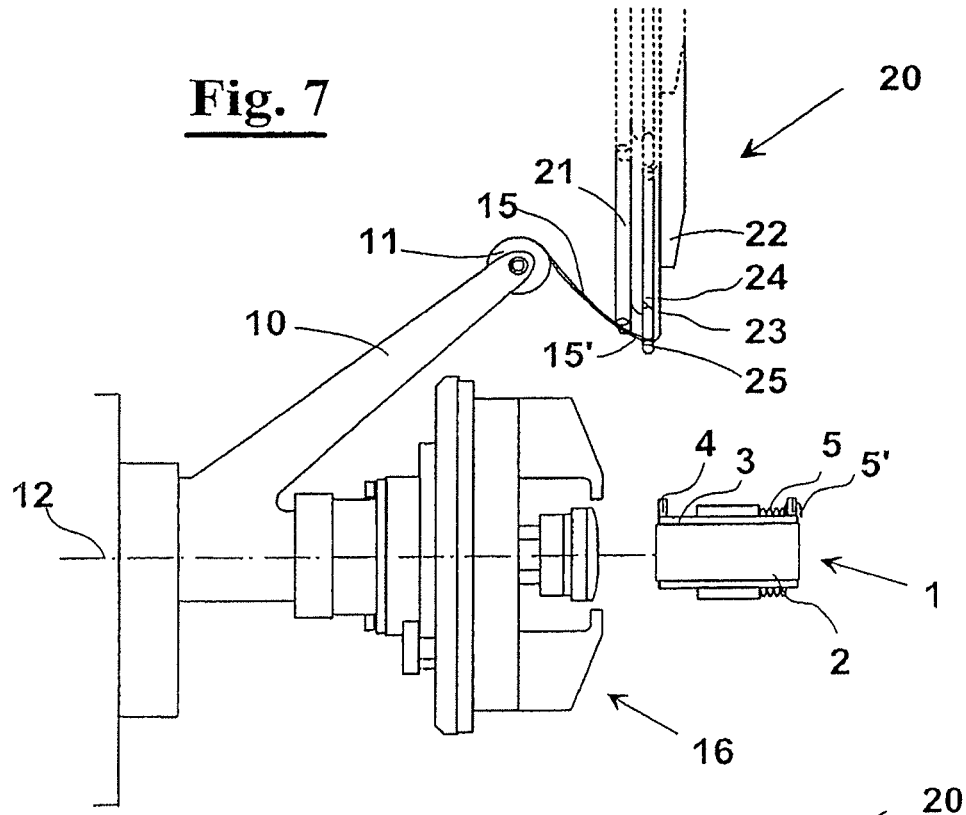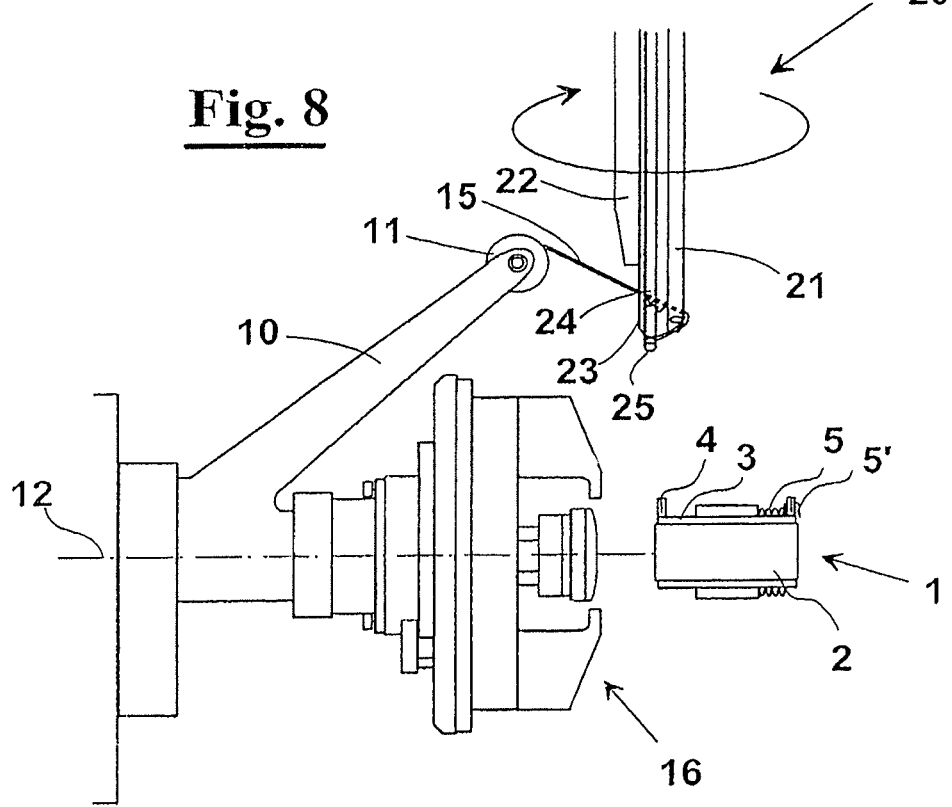

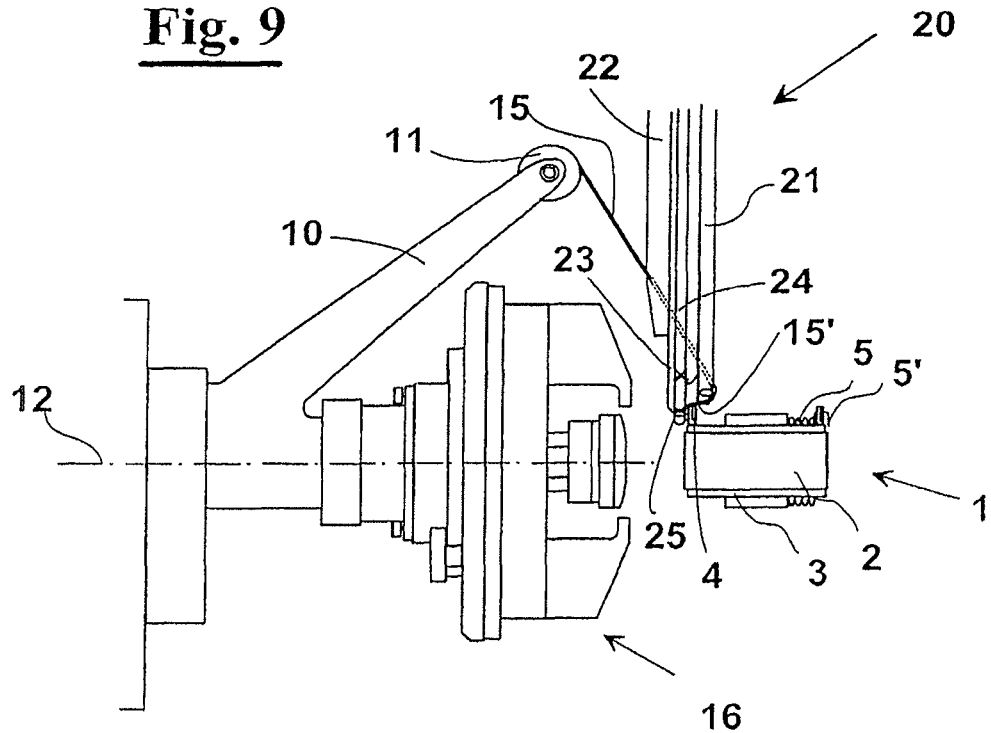
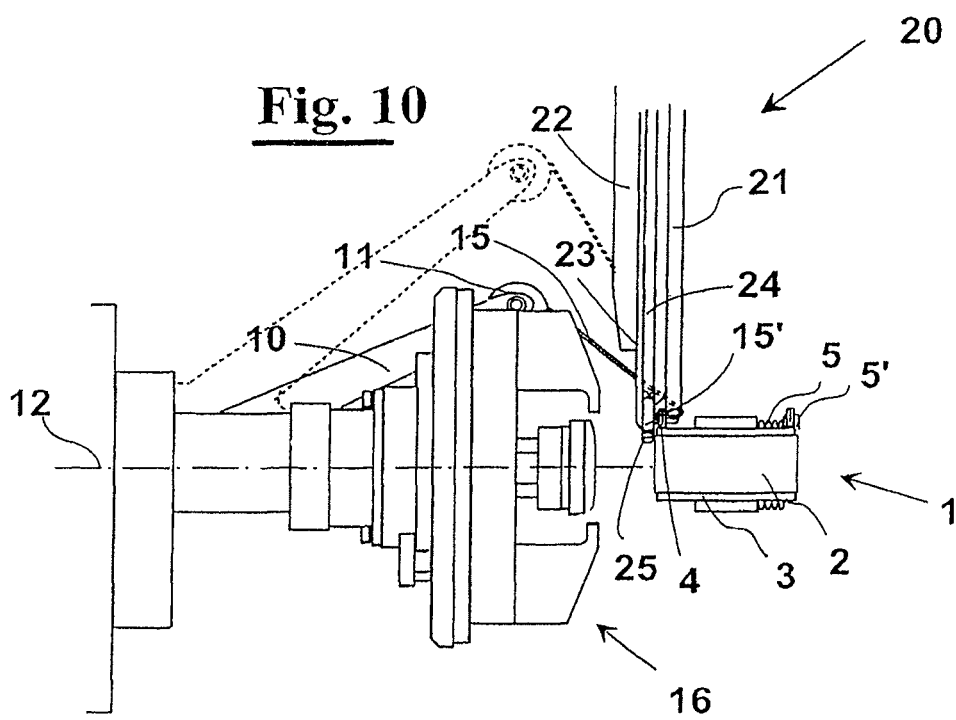

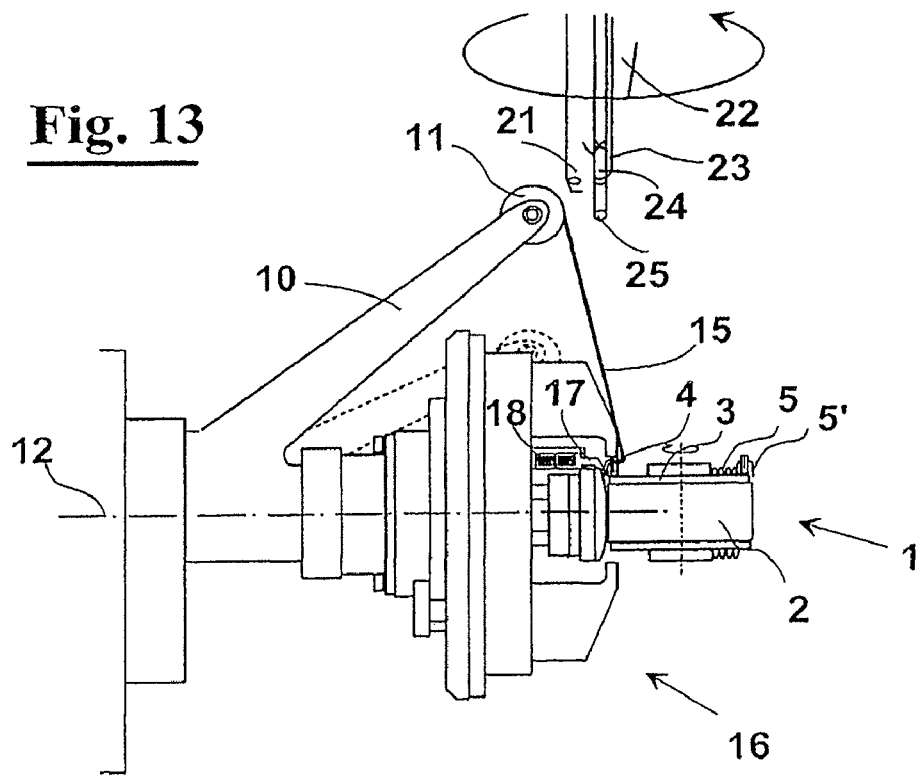
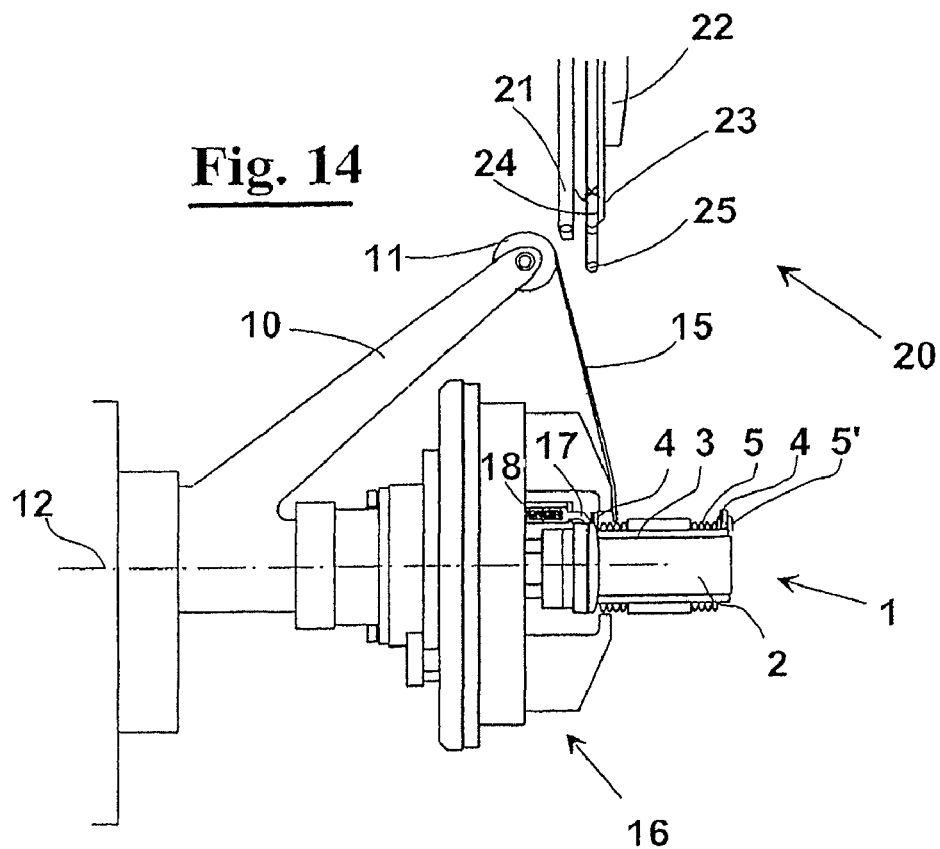

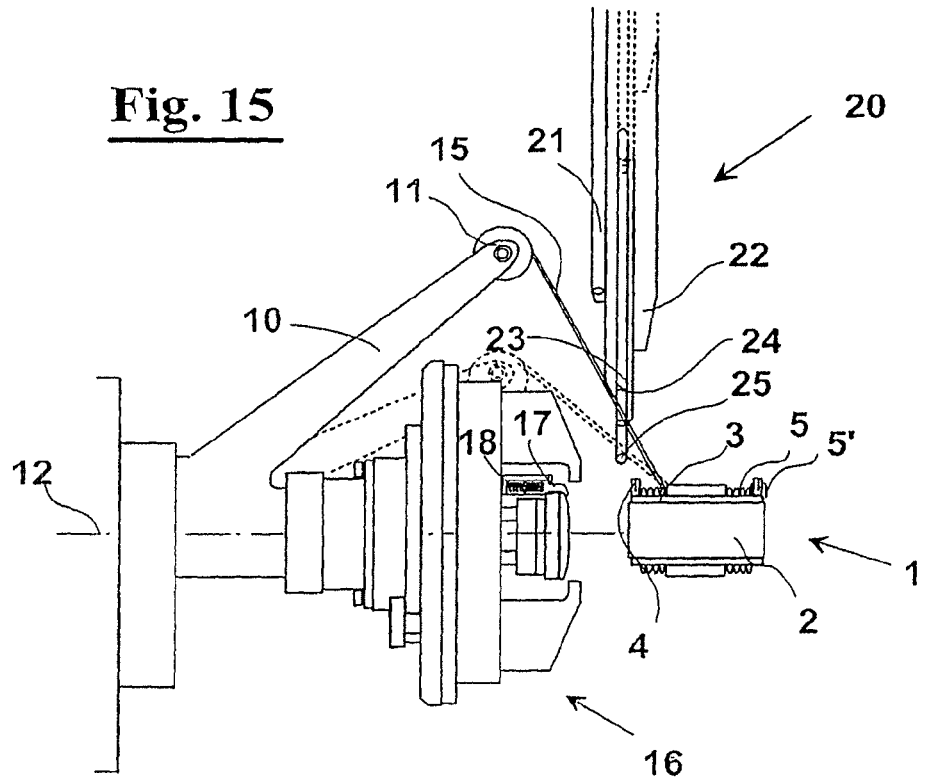
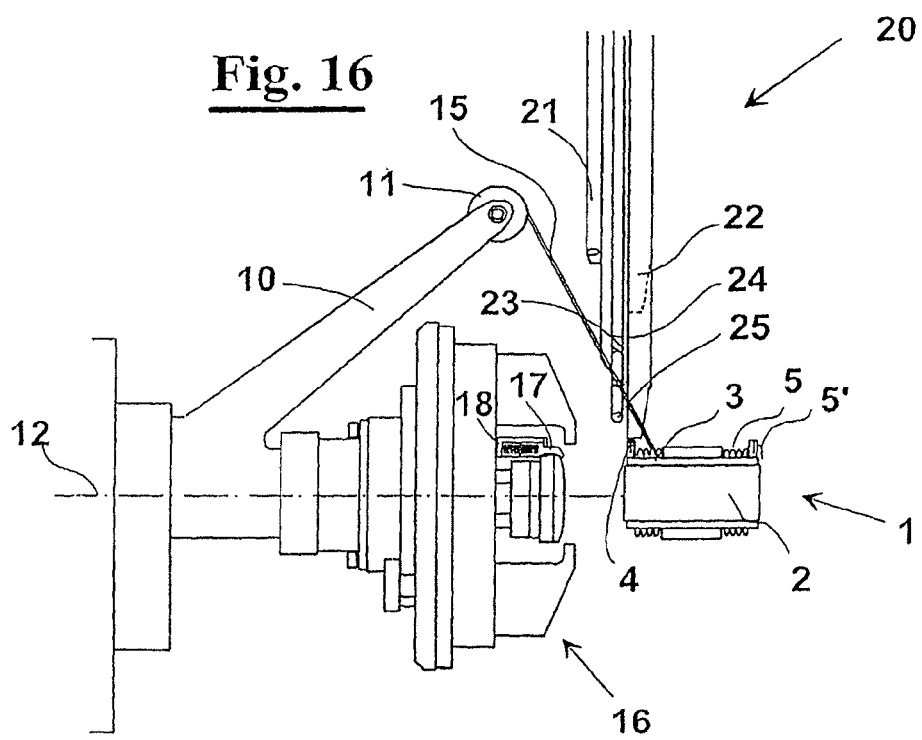

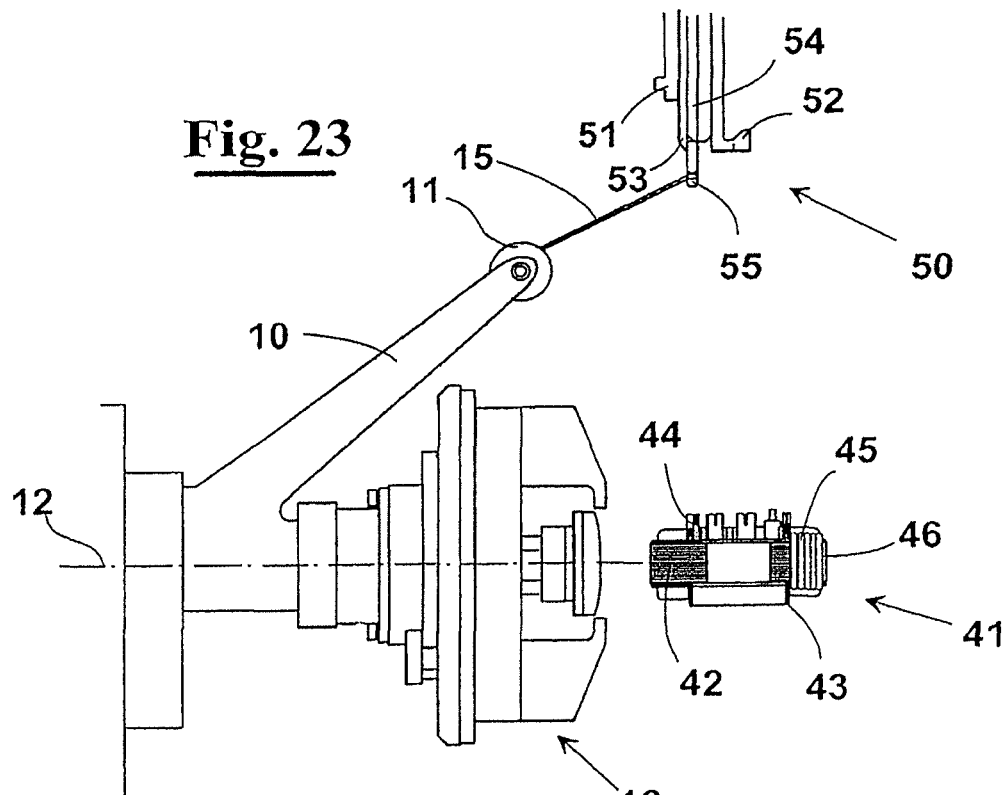
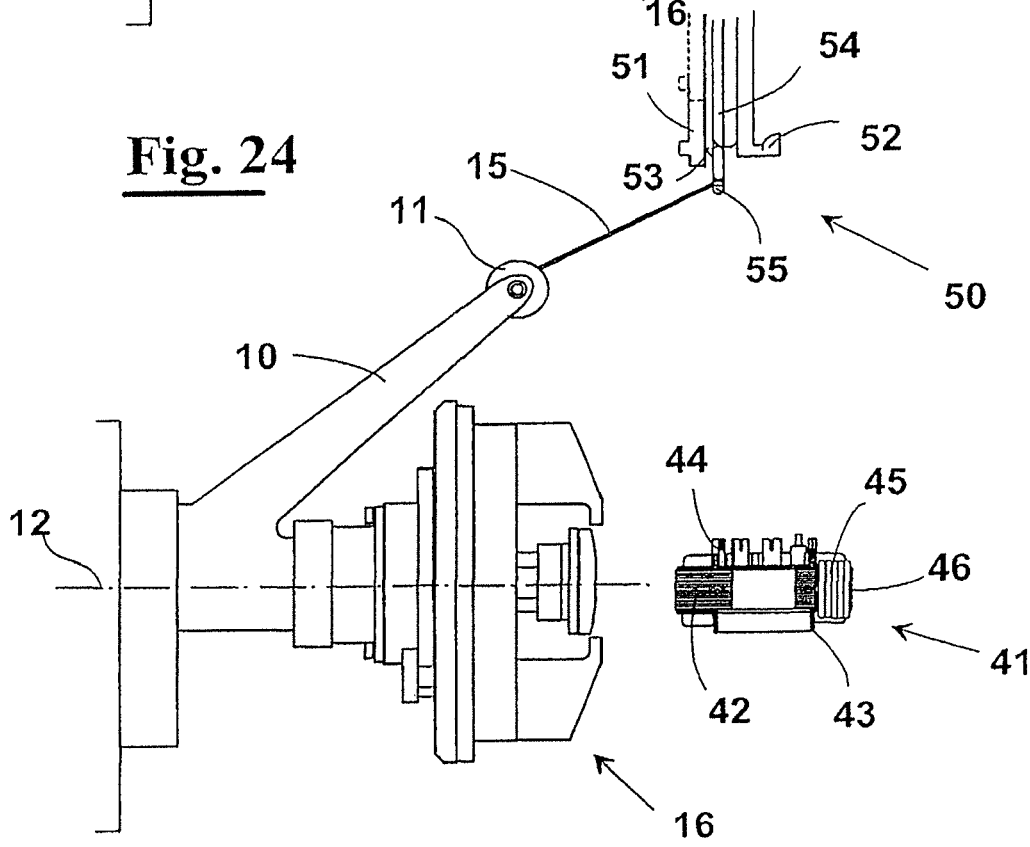

METHOD AND APPARATUS FOR WIRE TERMINATION ON OUTWARDLY SPOOLED MULTI-POLE STATORS

CROSS REFERENCE TO RELATED APPLICATIONS

This application is a continuation of U.S. application Ser. No. 11/787,191, filed on Apr. 12, 2007 now abandoned (and hereby incorporated by reference herein in its entirety), which is a continuation of U.S. application Ser. No. 11/078,459, filed on Mar. 11, 2005 (now abandoned), which application is a continuation of U.S. application Ser. No. 10/406,471, filed on Apr. 3, 2003 (now abandoned), which application claims foreign priority under 35 U.S.C. §119 to European Patent Application No. 02425221.5, which application was filed on Apr. 10, 2002.

FIELD OF THE INVENTION

The present invention relates to the field of stator winding machines, and precisely it relates to a method for wire termination on outwardly spooled multi-pole stators. Furthermore, the invention relates to an apparatus that carries out this method.

BACKGROUND OF THE INVENTION

Outwardly spooled multi-pole stators are known, formed by a substantially star-shaped stack of sheets featuring a plurality of poles extending from a tubular core. The stators of this type are suitable for coupling with an inner concentric armature or outer ring armature. They are common in brushless motors.

The peripheries of the poles, or pole extensions, form substantially a cylinder with a plurality of slits parallel or oblique with respect to the axis of the stator. The peripheries of the poles are connected to the core by means of pole walls that define corresponding grooves, accessible through the slits. The grooves have to be filled with insulated lead wire, by creating coils spooled about the pole walls.

At winding, where possible, the wire must pass necessarily through the slits for entering the grooves, and has to be guided to avoid collisions against the edges of the grooves. To this purpose, winding machines exist having a winding arm, or flyer, which rotates causing the wire to follow a circular trajectory and thus spooling the coil about each pole wall. The wire follows the circular trajectory while it is guided in the slits by means of special winding shrouds.

The shrouds are normally of two types, usually sufficient to wind the most common outwardly spooled multi-pole stators: a couple of lateral guiding plates, which form substantially a channel that aids the wire to enter the slits; hits are thus avoided of the wire against the edges of the poles adjacent to the pole being wound; a shroud that allows the wire to overtake the pole making substantially a double slide guide that deviates the wire from its own circular trajectory and brings it to wind about the pole wall. The shroud normally is mounted on a support shaft, that is co-axial to the flyer and is movable towards/away from the axis of the stator, for laying uniformly the wire helically about the pole wall. It can be either a whole block, or formed by two symmetrical mobile halves.

The flyer, at winding, rotates about the support shaft of the shroud in order to have its free end move in orbital position both with respect to the pole being wound and to the shroud that guides the wire in the grooves.

Every portion of wire wound about one or more poles has at least two ends. To assure the electrical contact necessary for the induction current to pass, which causes the armature to rotate and causes the motor to work, the ends have to be inserted into terminals. The terminals, in turn, when the motor is assembled, are connected to the current supply circuits for operation of the motor. The terminals are integrated in a terminal board, which is a body of plastic material that insulates axially the stack of sheets that form the ferromagnetic core of the stator.

The termination, in outwardly spooled multi-pole stators, which allow a winding by means of a flyer, is carried out in the way indicated hereinafter: before winding each pole, or plurality of in-phase poles, the flyer cooperates to put the wire ends in the terminals with a termination apparatus; at the end of winding of each pole or several poles, the outgoing wire is kept stretched by the flyer so that the termination apparatus can catch it, cooperating with the flyer for carrying out the termination, and finally cutting the wire close to the terminal, gripping the end of the wire that comes from the flyer and awaiting the start of next winding step; in the two termination steps as above described, the movement of the flyer is programmed with fractions of clockwise and/or anticlockwise rotation and with approaching motion of the stator, for cooperating with the termination apparatus and causing the wire to follow a path that approaches the terminal.

Traditionally, the termination apparatus comprises tools like lead pulls, cutters, and clamps, which move in a direction which, normally, is orthogonal to the axis of the stator. When winding stators with inner poles, by means of a reciprocating shaft with wire distribution needles, owing to the central position of the shaft, the termination apparatus can be arranged in the easiest way for catching the ends. Instead, when winding stators with external poles, with a flyer, the position of the termination tools interferes with the movement of the flyer, and they are therefore complex to arrange.

Furthermore, when the flyer moves the wire must be blocked in the terminal, to avoid that it can move away from the terminal at winding in the first coils. In fact, the movement of the flyer keeps the wire stretched while the termination is carried out. The wire can be blocked, in most of cases, at a suitable moment with a special instrument on board the machine and that engages the terminal, approaching orthogonally to the axis of the stator.

However when the terminal is located outside, on the external boundary of the stator, a tool that approaches the terminal, for blocking the wire and avoiding sliding in the terminal, would obstruct the flyer, which as said above moves in an orbital position about the pole.

On the other hand, a manoeuvre of terminating carried out without blocking the wire is risky, even with a terminal with special auto blocking shape, owing to the tension on the wire stretched by the flyer, which can cause it to disengage.

A further problem is that, when introducing an end wire in a terminal, the end protrudes of a certain amount beyond the terminal, and has to be trimmed. Thus, an off-cut wire portion would fall at the base of the machine or, where possible, in a container located underneath. This has the risk that the off-cut portion can sometimes jam into the machine or remain accidentally wound in the stator, causing in both cases a serious drawback.

SUMMARY OF THE INVENTION

It is therefore an object of the present invention to provide a method of wire termination on outwardly spooled multi-pole stators in which the termination steps do not obstruct the movement of the flyer.

Another object of the present invention is to provide a terminating device that moves without obstructing the movement of the flyer during the termination.

It is a particular object of the present invention to provide a method of wire termination on outwardly spooled multi-pole stators, with terminals located outside, where the wire can be blocked with respect to the terminals during the step of terminating with the aid of the flyer.

It is another particular object of the present invention to provide a terminating device that carries out the above method in case of outwardly spooled multi-pole stators with terminals arranged on the boundary, directly onto the poles.

It is a further particular object of the present invention to provide a terminating device that carries out this method in case of outwardly spooled multi-pole stators with terminals arranged within the poles.

It is still another particular object of the present invention to provide a terminating device wherein an end of the wire, after introduction into the terminals, does not protrude from them, or protrudes in a minimum way, without the need of being trimmed and making an off-cut portion.

According to a first aspect of the invention, a method for wire termination on outwardly spooled multi-pole stators, wherein the stators are formed by a core of ferromagnetic sheets, having an axis and a plurality of poles that radially extend defining grooves between them, and by a terminal board that covers in part the core and has a plurality of terminals, wherein the wire is wound about the poles distributed by a rotatable arm and guided by shrouds that move radially with respect to the stator overlapping the respective polar extension, and wherein before and/or after winding, wire termination operations are performed on the wire in the terminals with the aid of the rotatable arm, the operations of terminating comprising steps of catching, moving, introducing in the terminals and cutting a portion of wire, has the characteristic that the steps of catching, moving, introducing and cutting the wire occur by means of a single multifunctional instrument having an axis parallel to the axis of the stator, capable of carrying out a plurality of movements parallel to and/or rotations about said axis.

Preferably, the axis of the multifunctional instrument is incident to the stator.

Preferably, the step of introducing the wire comprises, before starting the winding step, a step of creating a bridge of wire between a clamp and a taker-in element, and a step of introducing the wire bridge in the terminal by translating the bridge parallel to the axis. The step of creating the bridge can be carried out by rotating the clamp and the taker-in element about the axis.

Advantageously, the step of cutting the wire is carried out by bringing a blade parallel to the axis up to intersecting the wire, kept by a clamp.

The step of cutting the wire is associated with a movement of folding the portion of cut wire protruding from a terminal to bend along the terminal side before the start of winding.

The portion of cut wire bent along the terminal side, advantageously, is kept pressed against the terminal at least during the first winding phases. In a preferred embodiment, when the terminal is arranged peripherally on the polar extension, the portion of cut wire is kept pressed elastically by an element associated with the shroud that extends from the shroud in a direction orthogonal to the axis.

Preferably, the step of catching the wire, when after winding a portion of wire is stretched between the flyer and a spooled coil, is carried out by translating a clamp parallel to the axis up to a predetermined position, opening the clamp, rotating the flyer until the stretched wire portion does not intersect the predetermined position, and closing the clamp.

The steps of catching the wire and of terminating can be aided by indexing the stator about its own axis.

Advantageously, a step is provided of bringing the portion of wire to the predetermined position by a protruding element that rotates coaxially to the clamp and intersects the portion of wire.

According to another aspect of the invention, a method for wire termination on outwardly spooled multi-pole stators, wherein the stators have a core from which radially extend a plurality of pole walls with poles defining grooves between them, the pole extensions having longitudinal edges, which define the slits for entering the grooves, and circumferential edges that define the height of the stator, the poles having terminals, wherein the wire is wound about the pole walls by means of a rotatable arm guided by shrouds that overlap the circumferential edges of the pole and that move along a radial direction with respect to the stator for laying the wire along the pole walls, and wherein the rotatable arm carries out operations of wire termination on the wire ends in the terminals before and/or after winding, has the characteristic that a step is provided of blocking the wire ends near to or at the terminals, the step of blocking being carried out in a direction parallel to said radial direction.

According to still another aspect of the invention, in a stator winding machine of the above type a device is provided for wire termination on outwardly spooled multi-pole stators, wherein the stators are formed by a core of ferromagnetic sheets, having an axis and a plurality of poles that radially extend defining grooves between them, and by a terminal board that covers in part the core and has a plurality of terminals, associated to a stator winding machine comprising at least a flyer and a shroud that moves radially with respect to the stator overlapping the respective polar extension.

The device has means for terminating wire ends in the terminals with the aid of the flyer and of an index motion of the stator, and has the characteristic of having an axis parallel to the axis of the stator and of being equipped with means for catching, moving, and introducing in the terminals and cutting a portion of wire associated with means for their movement in a direction parallel to said axis.

The means for introducing the wire can comprise means for creating a bridge of wire between a clamp and a taker-in element, and means for introducing in a terminal the bridge by translating the bridge parallel to the axis. Preferably, the means for creating the bridge comprise means for rotating the clamp and the taker-in element about the axis.

Advantageously, the means for cutting the wire comprise a blade sliding parallel to the axis up to intersecting the wire, kept by the clamp.

The means for cutting the wire can be associated with a deflector movable parallel to the axis and suitable for folding the portion of cut wire protruding from a terminal bending along an end of same before the start of winding.

When the terminal is arranged peripherally on the pole, means can be provided for pushing the portion of cut wire bent along the terminal side at least during the first winding phases. Preferably, such pushing means comprise an element associated with the shroud that extends from the shroud in a direction orthogonal to the axis, the pushing element being biased by a spring.

Advantageously, the means for catching the wire comprise a clamp movable parallel to the axis up to a predetermined position, the clamp being formed by a first and a second gripper suitable for closing on each other with movement parallel to the axis.

Preferably, a second deflector is provided for bringing a portion of wire stretched between the flyer and the stator to the predetermined position, the second deflector comprising a protruding element that rotates coaxially.

According to a further aspect of the invention, a stator winding machine of the above type, comprising a rotatable arm suitable for winding the wire about the pole walls and shrouds that approach the circumferential edges of the polar extension, overtaking them and moving along an axis that is radial with respect to the stator for spooling the wire along the pole walls, has the characteristic that blocking means are provided for the wire ends near to or at the terminals, the blocking means moving in a direction parallel to said radial axis and having an end suitable for pushing an end against the stator near to or at the terminal.

Preferably, the shroud comprises a first portion that approaches from outside the polar extension, allowing a second portion to overtake the circumferential edges of the pole and move along the radial axis, the blocking means being mounted on the first portion.

Advantageously, the blocking means comprise a pin parallel to the radial axis and slidingly engaged in the first portion, being provided with a resilient element opposing to the sliding of the pin in the first portion.

BRIEF DESCRIPTION OF THE DRAWINGS

Further characteristics and the advantages of the method and of the device according to the invention for winding of multi-pole stators will be made clearer with the following description of an embodiment thereof, exemplifying but not limitative, with reference to the attached drawings, wherein:

FIG. 3 is an elevational side view of a terminating device on multi-pole stators according to a first embodiment of the invention;

FIG. 4 is an elevational front view of the device of FIG. 3;

Figure 1:
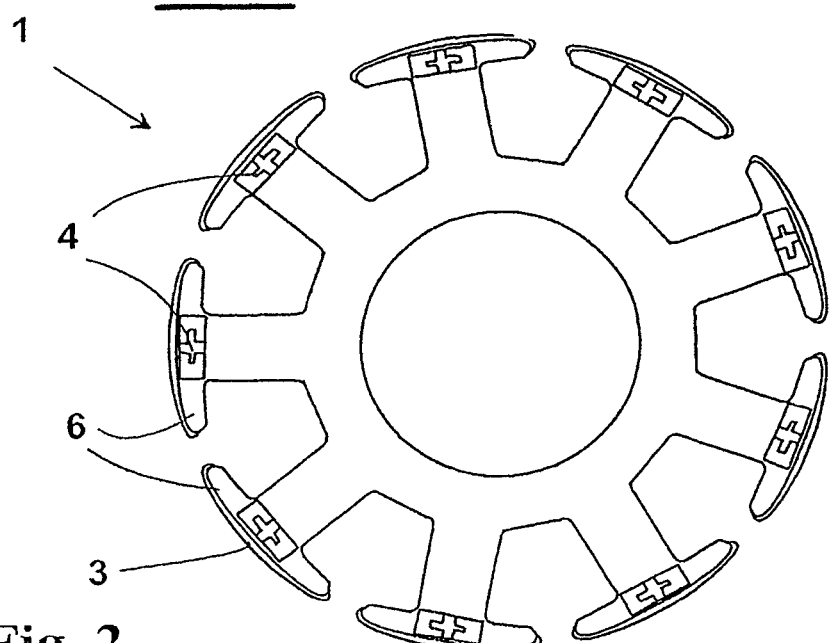
FIGS. 1 and 2 show, respectively, a top plan view and a side elevational view of an outwardly spooled multi-pole stator with terminals on the boundary of the pole extensions.
Figure 2:
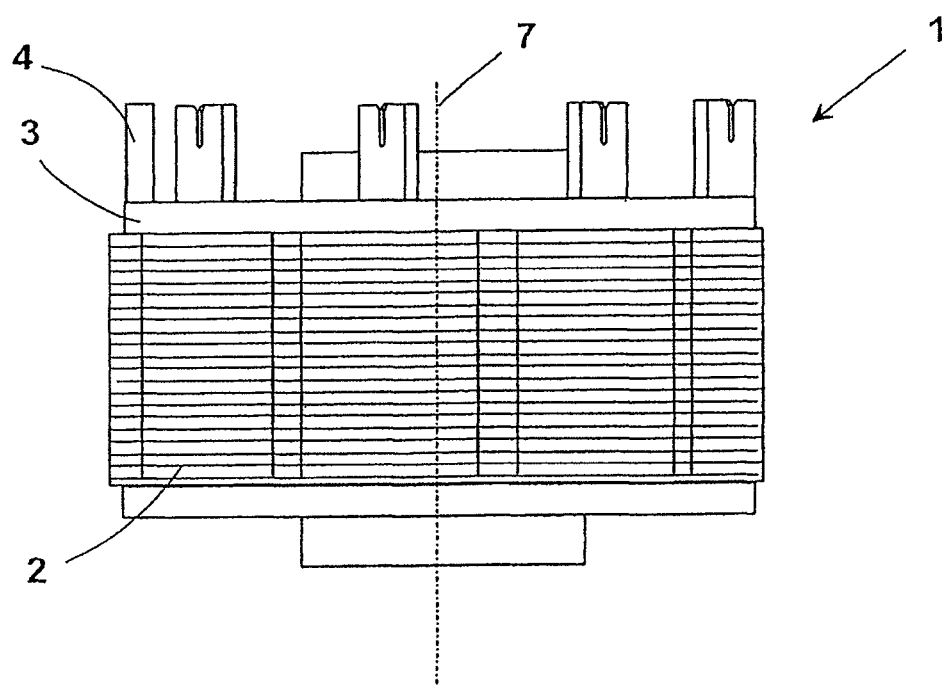
Figure 19:
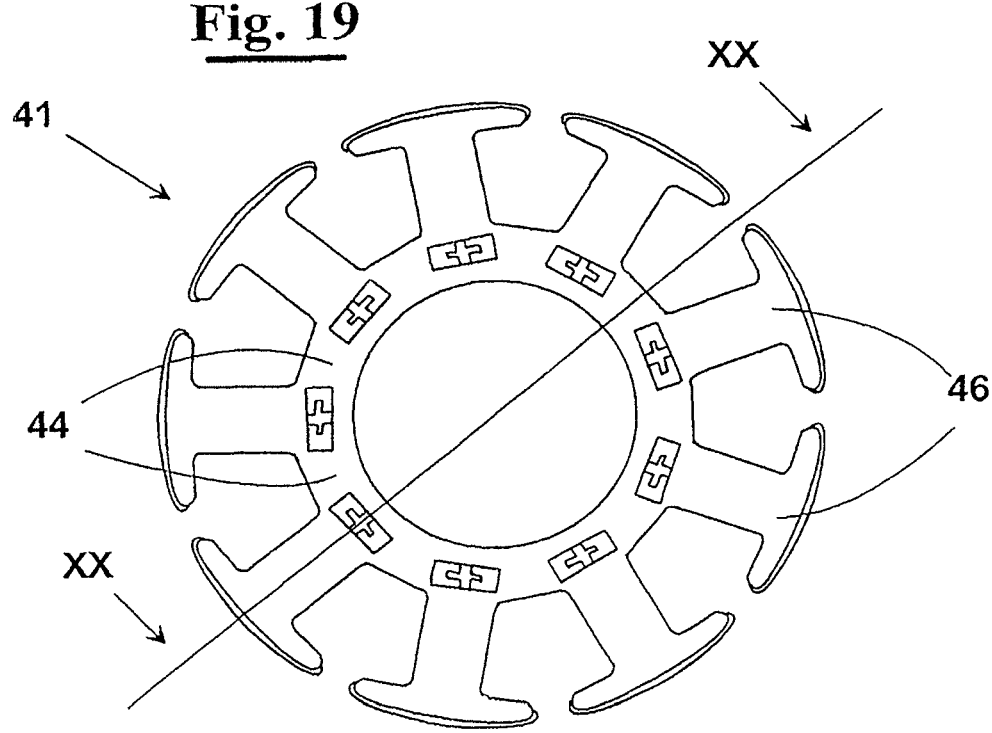
Figure 20:
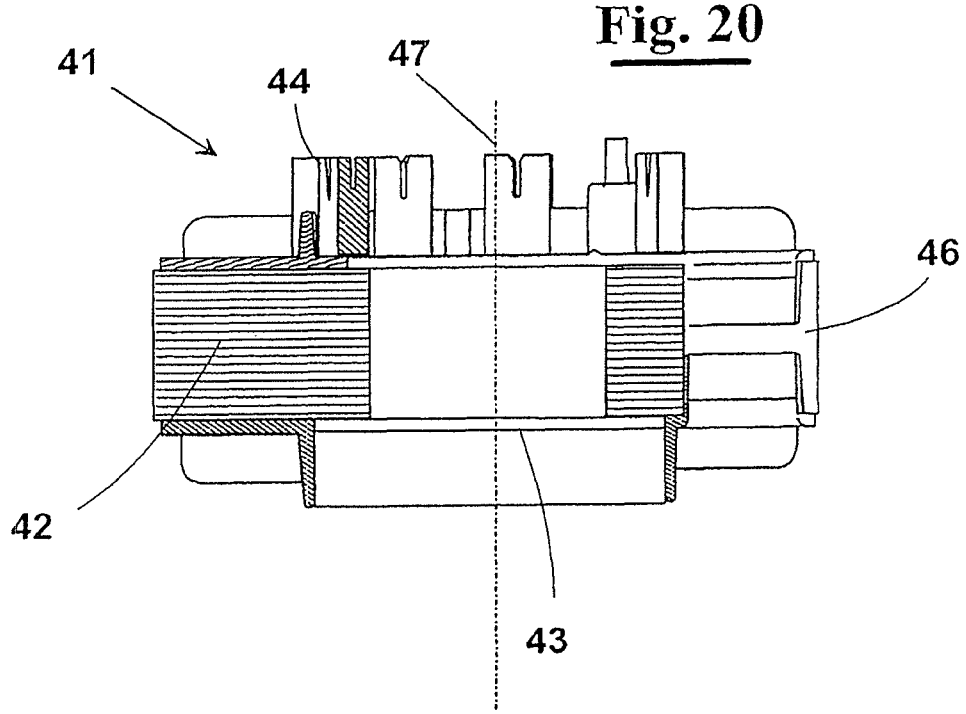
Figure 21:
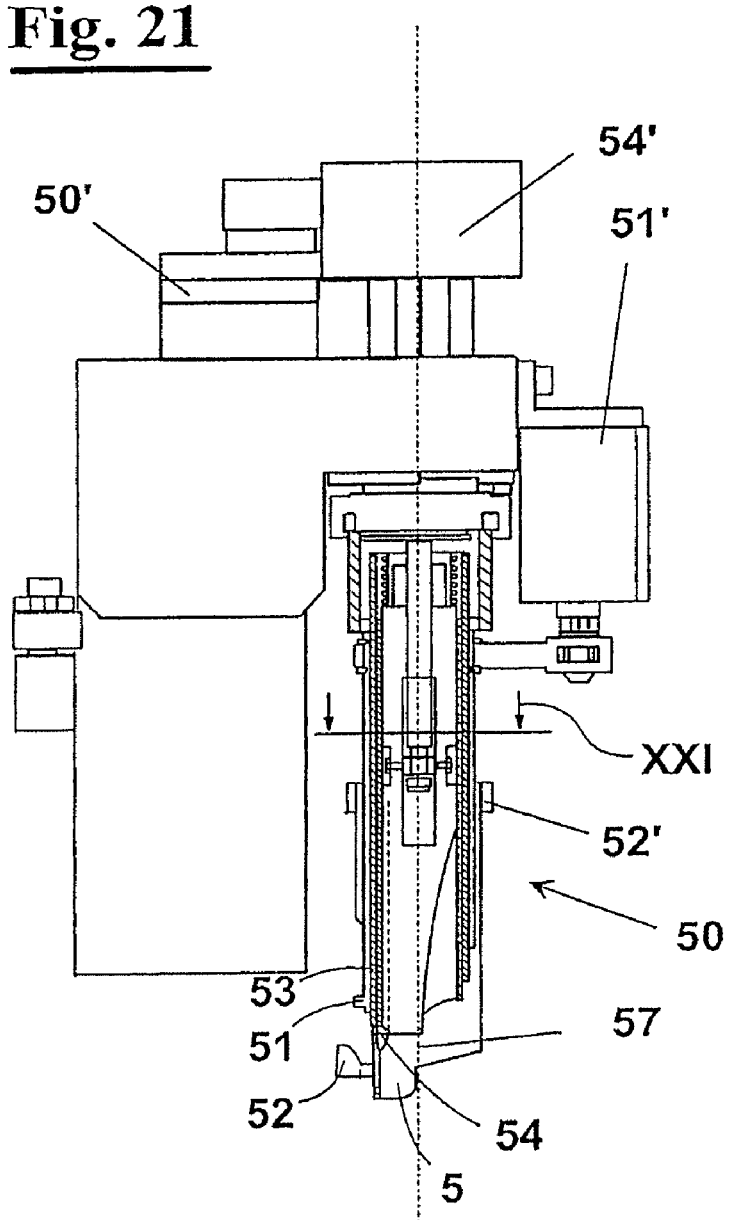
Figure 22:
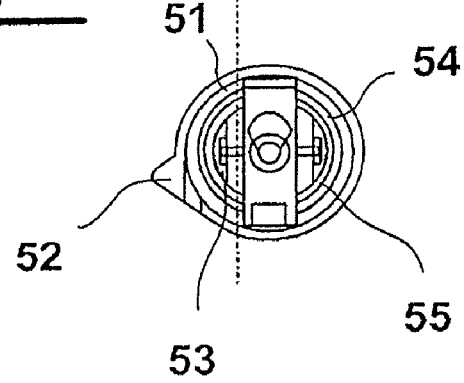

FIGS. from 5 to 18 show the succession of the steps to provide the wire termination on the multi-pole stator of FIGS. 1 and 2 with the apparatus of FIGS. 3 and 4;

FIG. 19 shows in a top plan view an outwardly spooled multi-pole stator with inner terminals;

FIG. 20 shows a cross-sectional view of the stator of FIG. 19 according to arrows XX-XX;

FIG. 21 is an elevational side view of the terminating device on multi-pole stators according to an alternative embodiment;

FIG. 22 is a cross-sectional view according to arrows XXI-XXI of the device of FIG. 21; and FIGS. from 23 to 36 show the succession of steps for wire termination on a multi-pole stator, according to an alternative embodiment.

DETAILED DESCRIPTION OF A PREFERRED EMBODIMENT

With reference to FIGS. 1 and 2, an outwardly spooled multi-pole stator 1 has a core formed by a stack of ferromagnetic sheets 2, having an axis of symmetry 7 and a plurality of poles 6 that radially extend defining grooves between them. Stack 2 is in part covered by a terminal board 3 that has a plurality of terminals 4. Terminals have a slit wherein a terminal of wire spooled about poles 6 has to be inserted.

A winding step, for example, is shown in FIG. 14. Wire 15 is wound about poles 6 distributed by a rotatable arm 10, or flyer, having a grooved end 11. Wire 15 slides through flyer 11, while it is kept stretched and fed by means not shown, and known to a person skilled in the art. At winding, wire 15 is guided by shrouds 16 that move radially with respect to stator 1 thus overlapping the respective pole 6. In FIG. 14, a pole 6 already wound with a coil 5 is shown on the right edge of the stator, with an end 5' that engages a terminal 4.

Before and after winding wire, termination operations are provided on the ends of wire 15 into terminals 4 with the aid of flyer 10, carried out by an apparatus equipped with a terminating device shown in FIGS. 3 and 4. Such operations, according to the invention, are described hereinafter.

Device 20 comprises a first deflector 21, a second deflector 22, a blade 23, and a clamp formed by a movable gripper 24 and a fixed gripper 25, the former being suitable for closing onto the latter for gripping wire 15. Device 20 can carry out steps of catching, moving, introducing and cutting wire 15 with movements parallel to its own axis 27, which coincides or is parallel to axis 7 of stator 1.

The device 20 can translate along axis 27 and rotate about axis 27 owing to a motor 24'. Fixed gripper 25 remains integral to it, which guides other tools 21, 22, 23, 24 as hereinafter indicated. Other tools can then move parallel to axis 27, and in particular: movable gripper 24 is operated by actuator 23'; blade 23 can move owing to the same actuator 23'; first deflector 21 is operated by actuator 21'; and second deflector 22 can move owing to actuator 22'.

The drives are not shown in detail since they comprise motors and linear actuators of known type to a man of the art.

Figure 5:
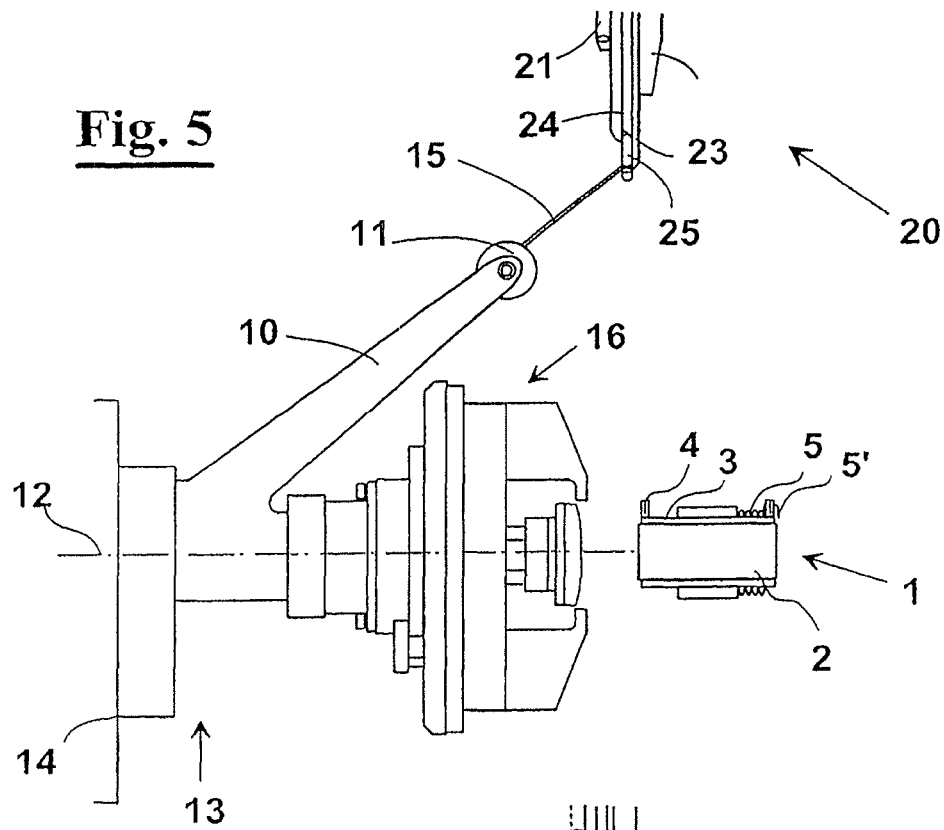

The steps of termination, according to the invention, are the following: before starting a winding cycle on one pole of a stator without previous windings, or on which a previous winding step has already been made of a coil 5, with end 5' in a terminal 6, wire 15 is kept by grippers 24-25 in a way shown in FIG. 5.

Figure 6:
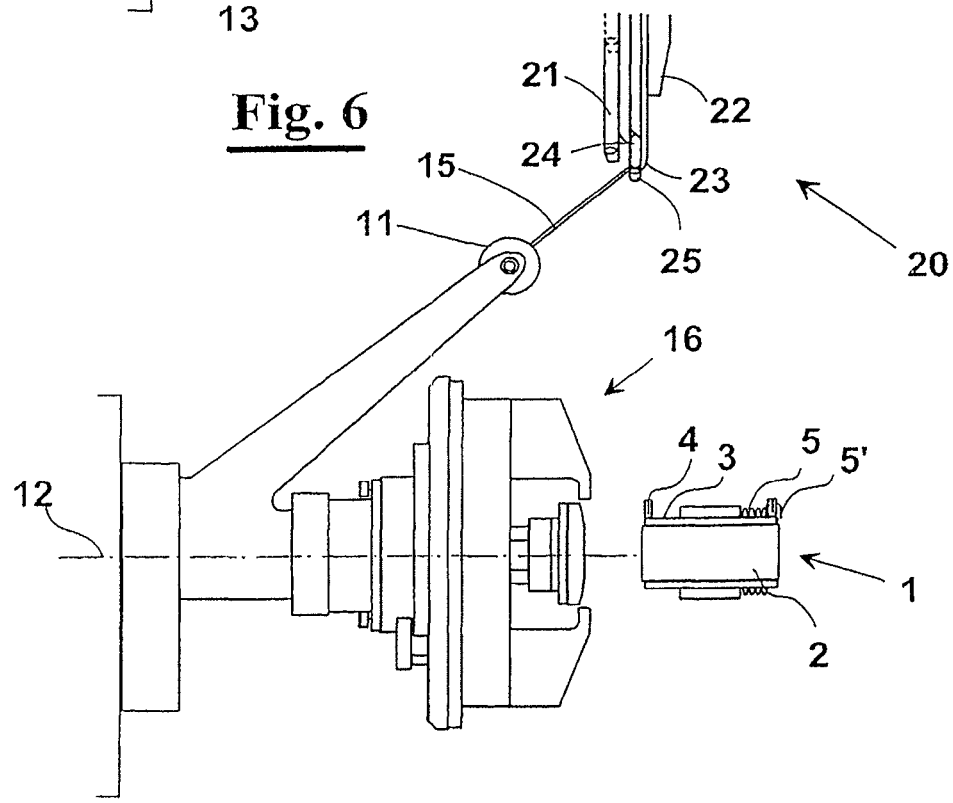

Then, first deflector 21 (FIG. 6) is lowered, and then the whole device 20 (FIG. 7) is lowered up to a step of creating a bridge 15' of wire 15 (FIG. 8) between grippers 24-25 and deflector 21. This is carried out by means of rotating device 20 about axis 27.

Figure 11:
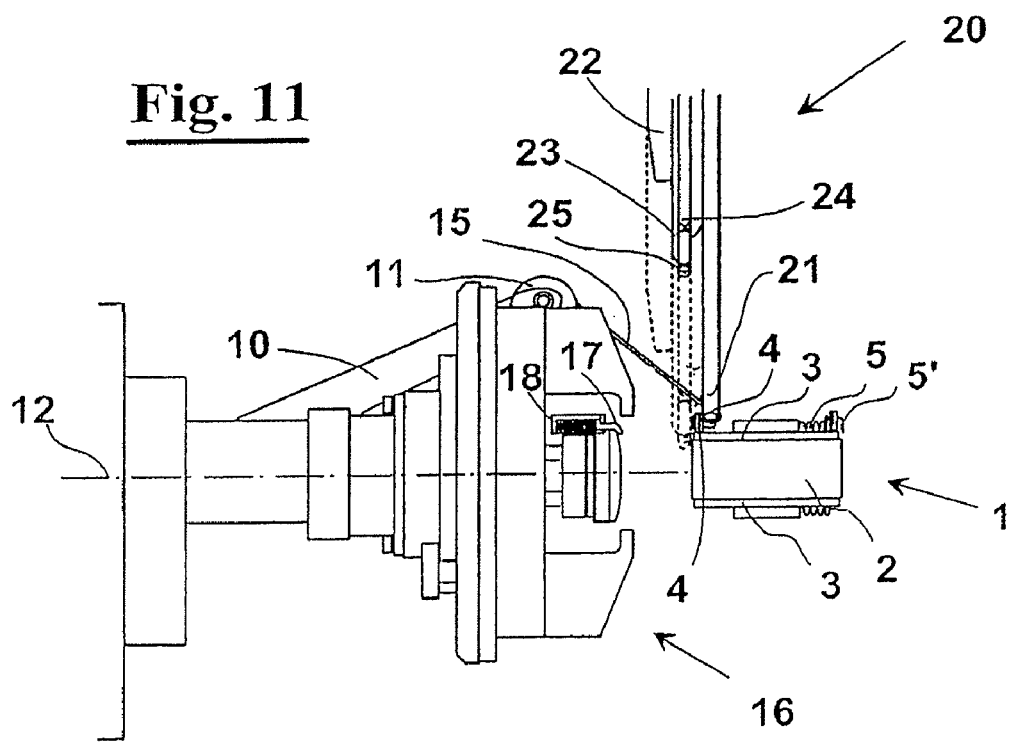

A step follows of introducing into a terminal 4 bridge 15' of wire 15 by translating along axis 27 (FIG. 9). A downwards movement of grippers 24-25 causes bending of end 5' along external wall of terminal 4, as shown in FIG. 10. At this point, end 5' is in terminal 4, but the tension of wire 15, and a further movement of flyer 10 for starting winding could cause the wire to disengage from terminal 4. For this reason (FIG. 11), first deflector 21 remains in a lowered position, bearing the tension of wire 15. At the same time the remainder of device 20 has moved upwards.

Figure 12:
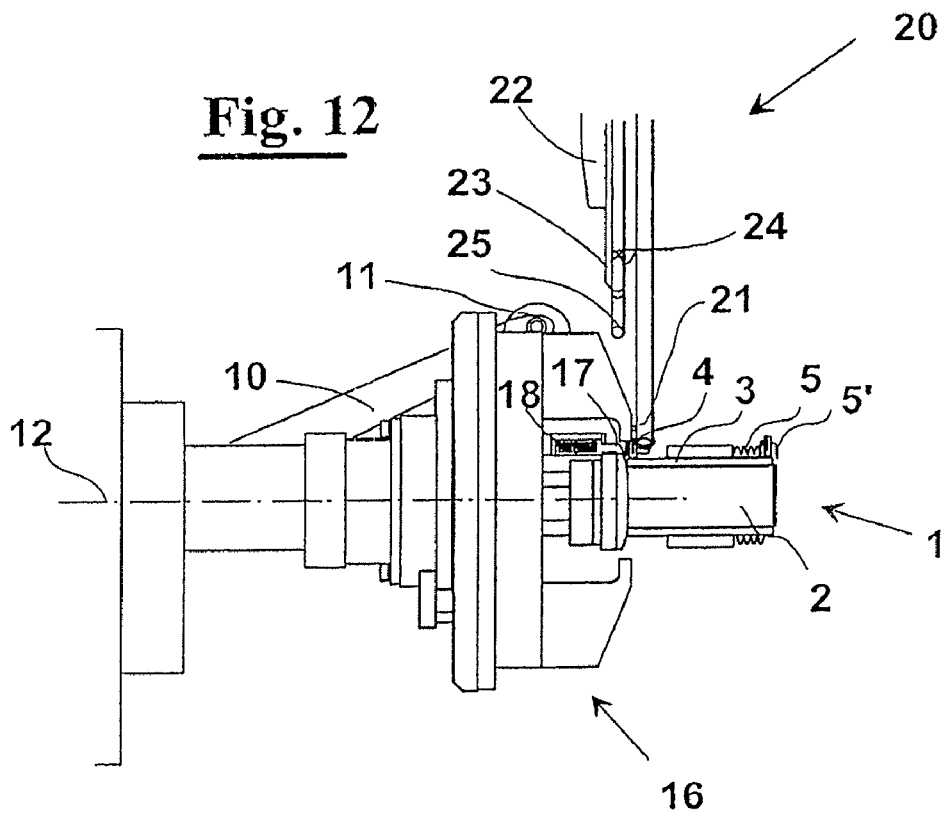

Then, as shown in FIG. 12, shroud 16 is approached to stator and is ready for winding. In this step, an end 5' of wire 15 is kept pressed against terminal 4 by a pushing element 17, associated with a spring 18, and integral to the body of shroud 16. Owing to the presence of pusher 17, first deflector 21 can rise (FIG. 13) and device 20 can rotate returning again to the starting position.

Pusher 17 keeps an end 5' pressed against terminal 4, so that winding can start (FIG. 14) and at winding of the first coils, the tension of wire 15 does not pull an end 5' out from terminal 4. At winding (FIG. 14) shroud 16 distributes the wire about the poles, and its reciprocation towards/away from axis of stator does not cause pusher 17 to lose contact from end 5', nor does it create interferences with the stator, owing to spring 18.

At the end of winding, the shroud withdraws, and the stator, in a way not shown, is subject to an index movement for winding a pole not next to that already wound. The wire, in this step, is not cut. Winding starts again, and eventually shroud 16 withdraws again (FIG. 15). Wire 15, that is stretched between flyer 10 and stator, needs to be cut and terminated into respective terminal 4.

Figure 17:
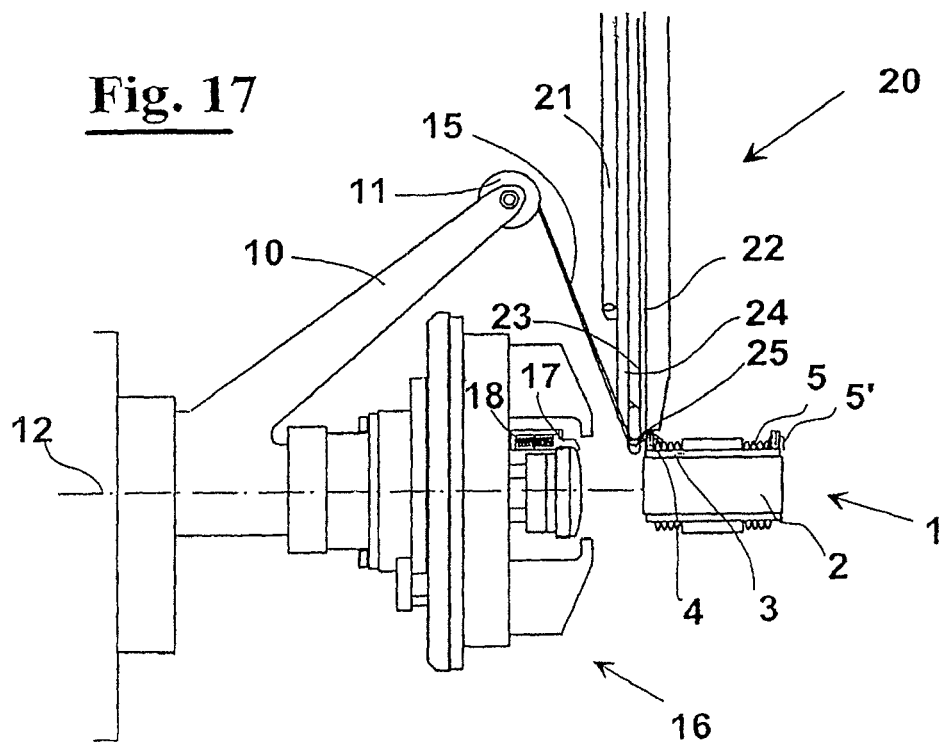
Figure 18:
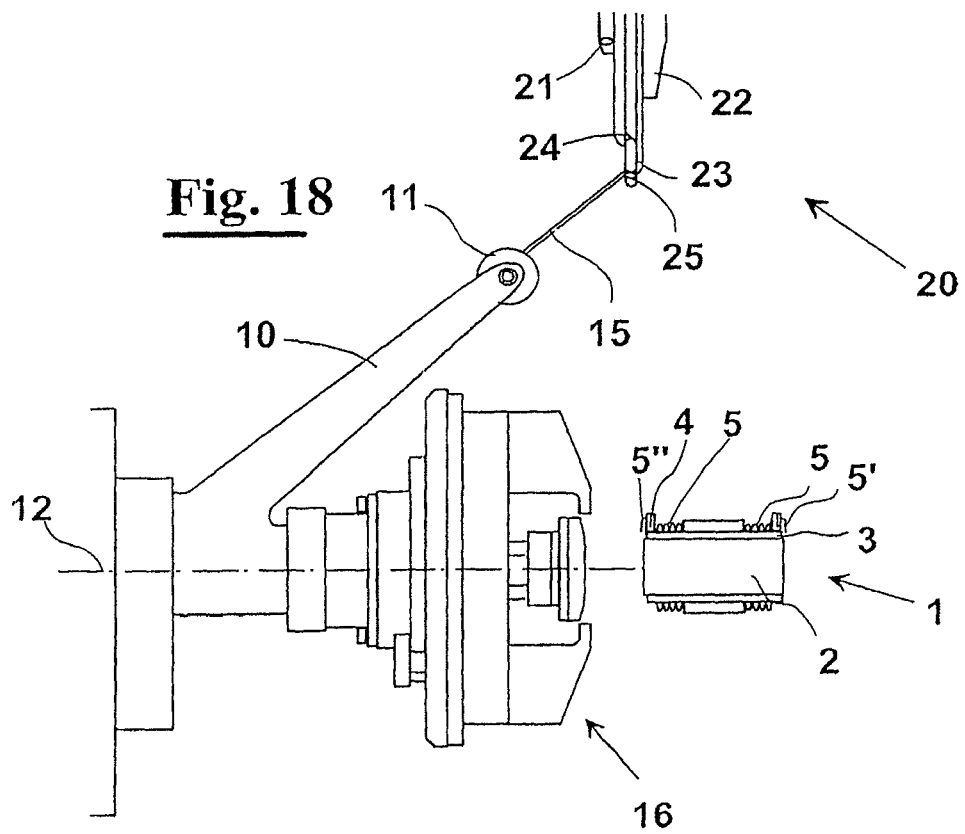

Then, device 20 is lowered, with grippers 24-25 open, in order to engage wire 15. A movement of flyer 10 can make this step easier. Then second deflector 22 is lowered and (FIG. 16) stops at the height of terminal 4. Then grippers 24-25 are lowered to cause the wire to enter the terminal (FIG. 17), and at same time, blade 23 cuts wire between grippers 24-25 and the terminal, so that an end 5" is cut close to terminal 4 and the other cut end of wire 15 remains on grippers 24-25. Finally, FIG. 18, device 20 moves up again, back to the position of FIG. 5, with stator 1 spooled with one or more coils 5 about respective poles 6, as well as with ends 5' and 5" inserted into respective terminals 4.

It must be noted that shroud 16, as shown in the Figures, can be replaced by a much simpler shroud, of the type formed by a single shield with central opening through which the pole of a stator passes when spooling. In this case, pushing element 17 is equally present, arranged in the central opening of this type of shroud.

An embodiment of the method according to the invention relates to winding an outwardly spooled multi-pole stator 41, FIGS. 19 and 20, that has a core formed by a stack of ferromagnetic sheets 42, an axis of symmetry 47 and a plurality of poles 46 that radially extend defining grooves between them. The stack 42 is, in part, covered by a terminal board 43 that has a plurality of terminals 44. The terminals 44 have a slit wherein an end 45' of wire 45 spooled about the poles 46 has to be inserted. The terminals 44, contrarily to the case of FIGS. 1 and 2, are arranged within the poles 46.

Figure 32:
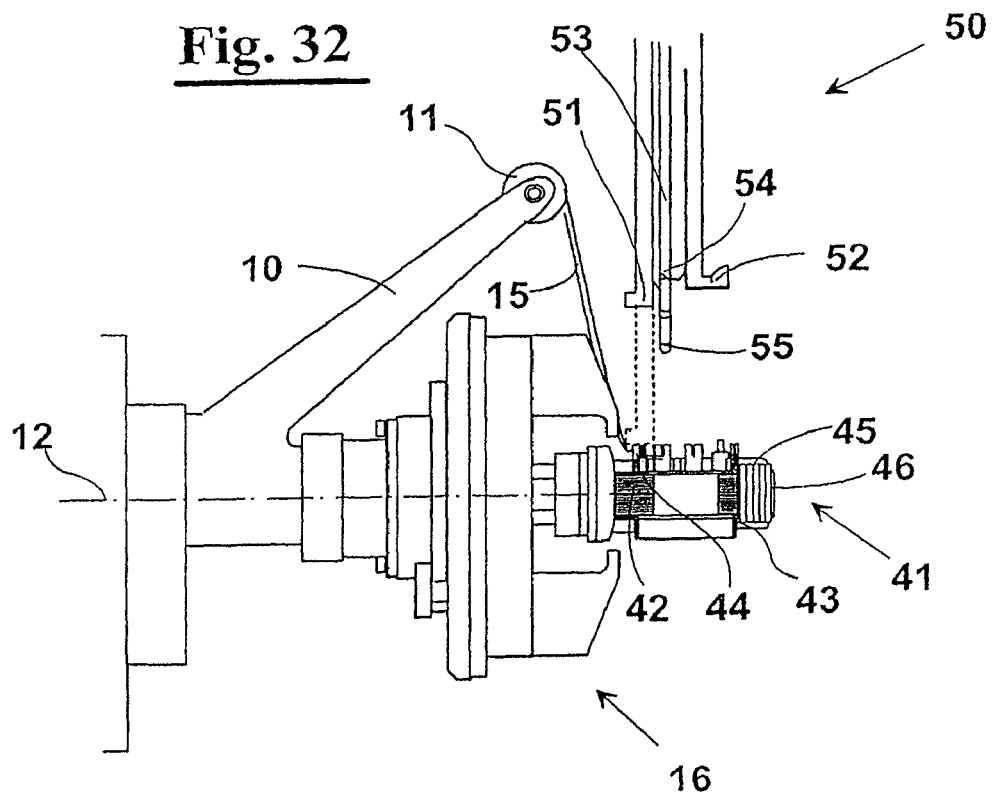

A winding step, for example, is shown in FIG. 32. The wire 15 is wound about the poles 46 distributed by flyer 10. Also in this case, before and after winding, wire termination operations are provided on the wire ends 15 into the terminals 44, with the aid of flyer 10, carried out by an apparatus equipped with a terminating device 50 shown in FIGS. 21 and 22. Such operations, according to the invention, are described hereinafter.

The device 50 comprises a first deflector 51, a second deflector 52, a blade 53, and a clamp formed by a movable gripper 54 and a fixed gripper 55, the latter being suitable for closing on the former for gripping wire 15. The device 50 can carry out the steps of catching, moving, introducing and cutting the wire 15 with movements parallel to its own axis 57, which coincides with or is parallel to axis 7 of stator 1.

The device 50 can translate along axis 57 and rotate about axis 57 owing to a motor 50'. Fixed gripper 55 remains integral to it. The other tools can then move parallel to axis 57, and in particular: movable gripper 54 is operated by actuator 54'; blade 53 can move integrally to movable gripper always owing to actuator 54'; first deflector 51 is operated by actuator 51'; and second deflector 52 can move owing to actuator 52', partially hidden in FIG. 21.

In a way similar to the previous case, the steps of termination, according to the invention, are the following: before starting a winding cycle on one pole of a stator without windings, or on which have already been spooled some coils 45, with end 45' in a terminal 44, the wire 15 is kept by the grippers 54-55 in the way shown in FIG. 23.

Figure 25:
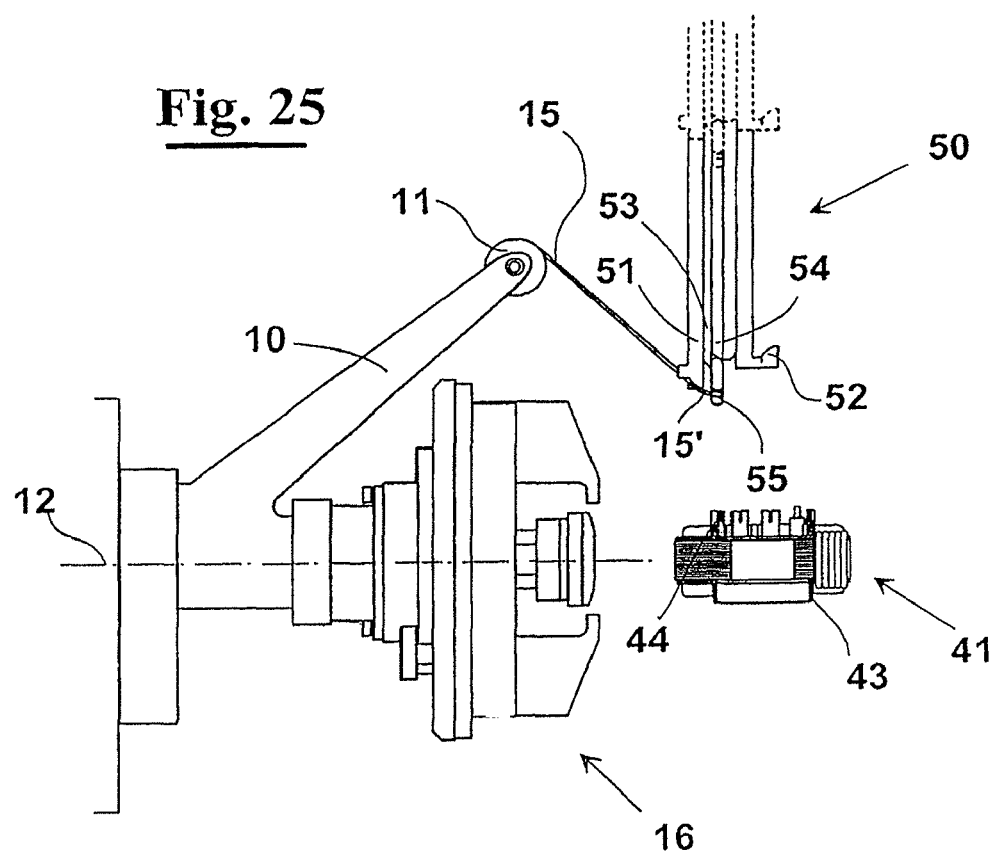
Figure 26:
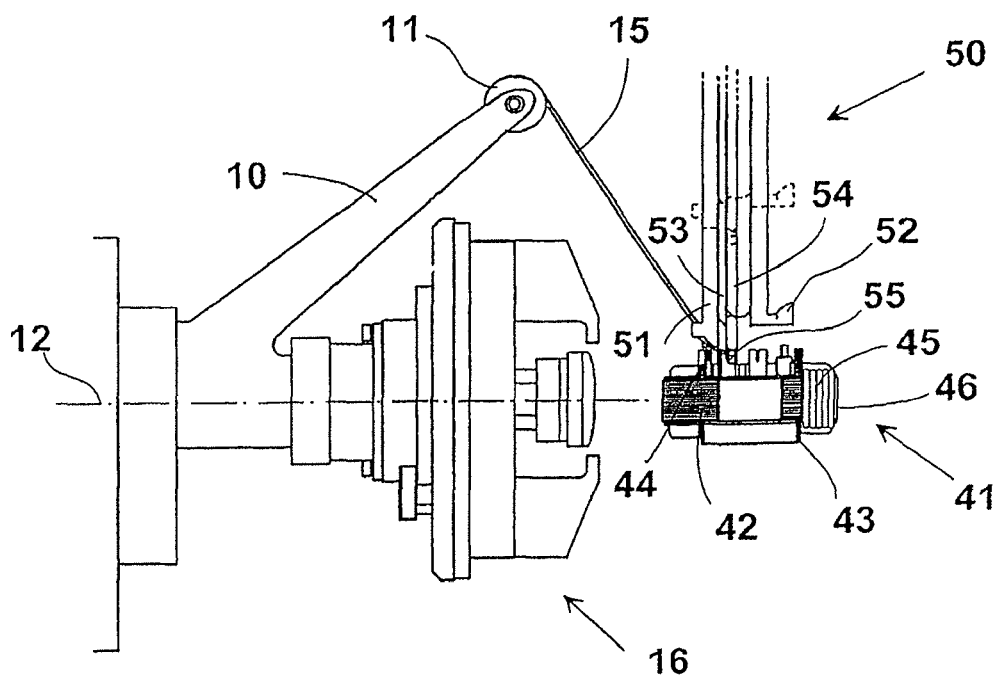

Then, the first deflector 51 (FIG. 24) is lowered, and then all the device 50 (FIG. 25) is lowered up to a step of creating a bridge 15' of wire 15 between the grippers 54-55 and the deflector 51. A step follows of introduction into a terminal 44 of bridge 15' of wire 15 by translation along the axis 57 (FIG. 26).

Figure 27:
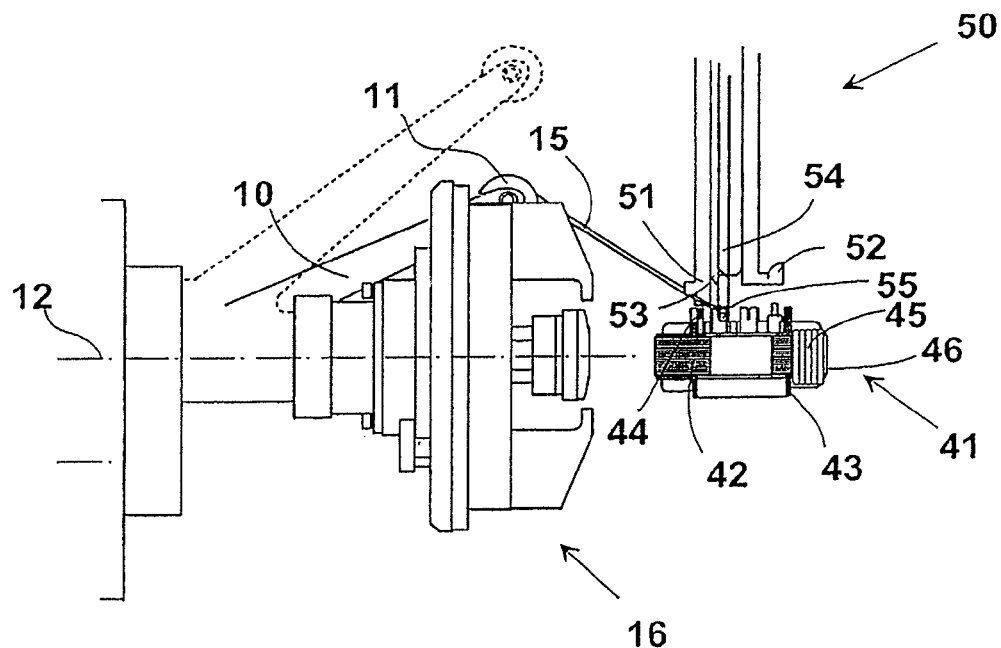
Figure 28:
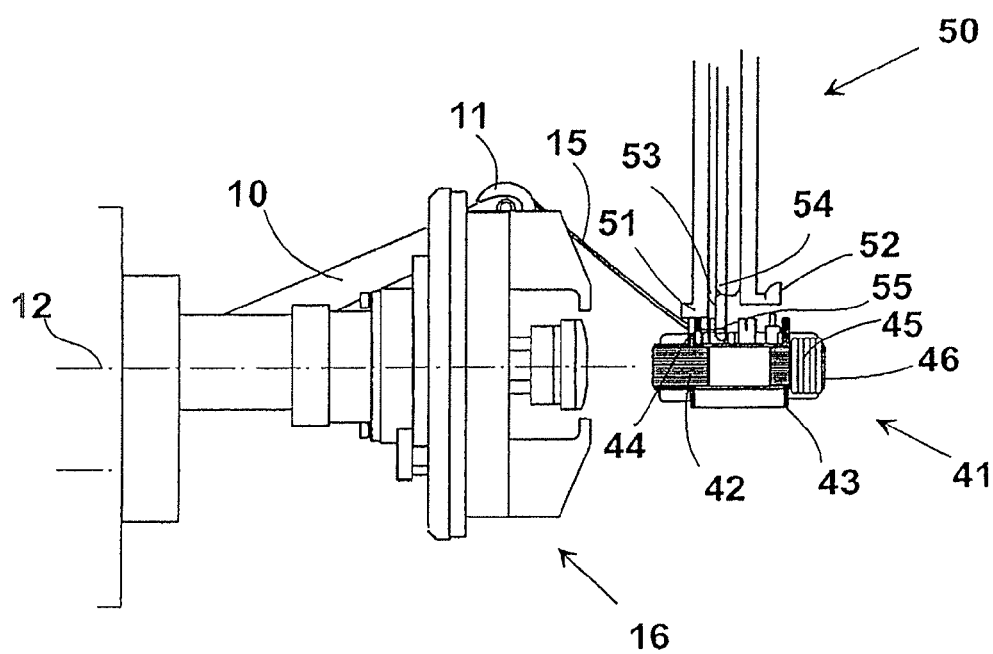
Figure 29:
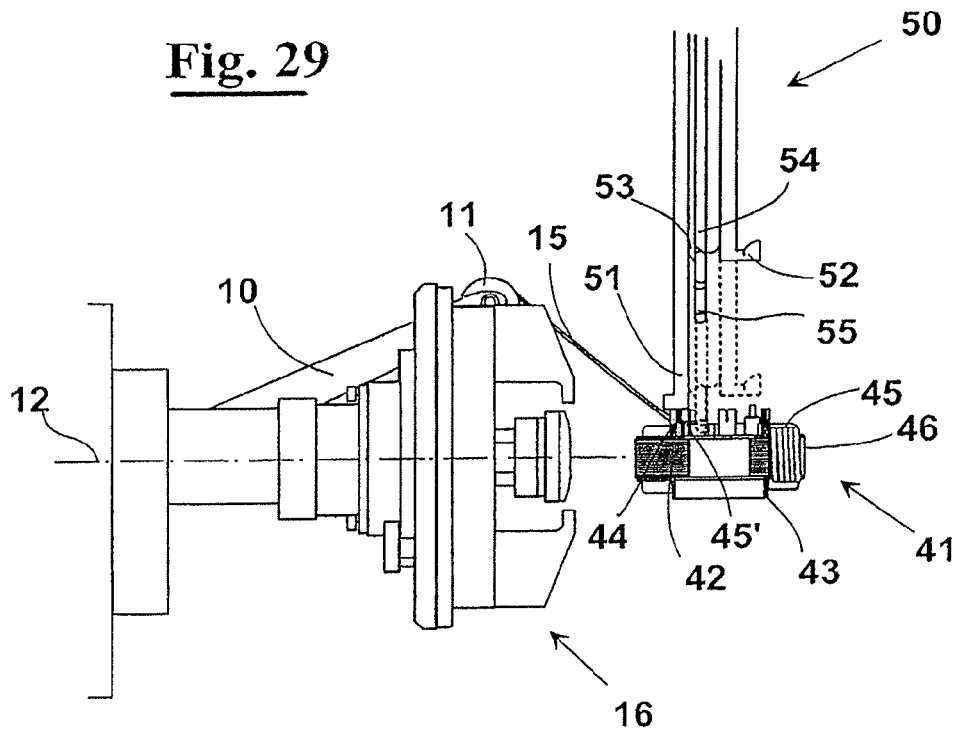

The rotation of flyer 10 about an angle orients correctly wire 15 for introducing it in a terminal 44 (FIG. 27). A further downward movement of grippers 54-55 causes end 45' to bend along the inner wall of terminal 44, as shown in FIG. 28. At this point, an end 45' is in terminal 44, but the tension of wire 15, and the following movement of flyer 10 for starting the winding, could cause the wire to disengage from terminal 44. For this reason (FIG. 29), first deflector 51 remains in the lowered position, bearing the tension of wire 15. At the same time the remainder of device 50 has moved upwards.

Figure 30:
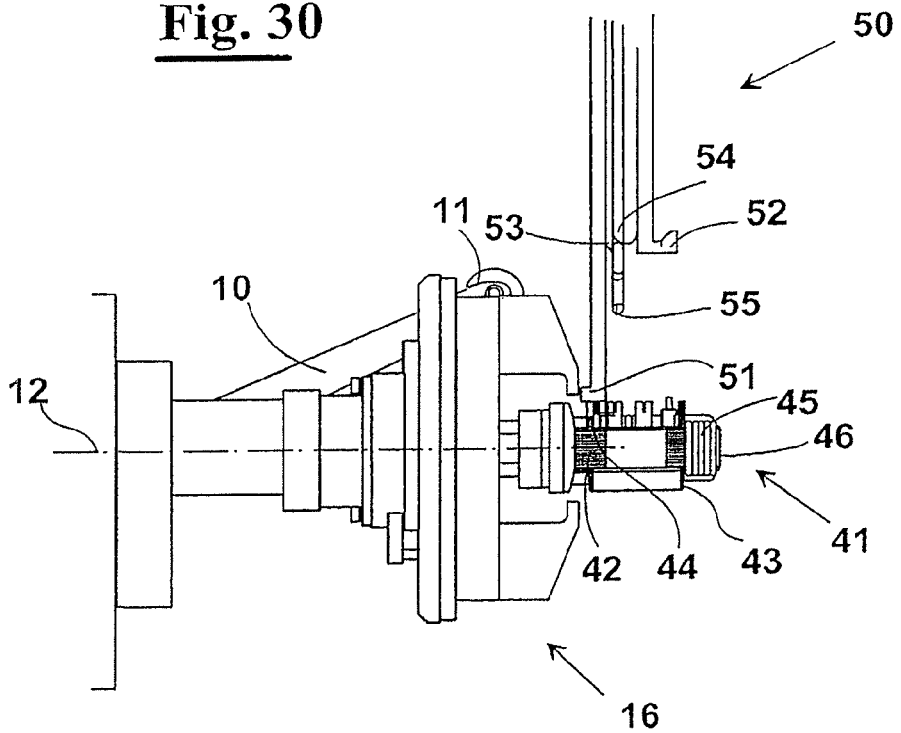
Figure 31:
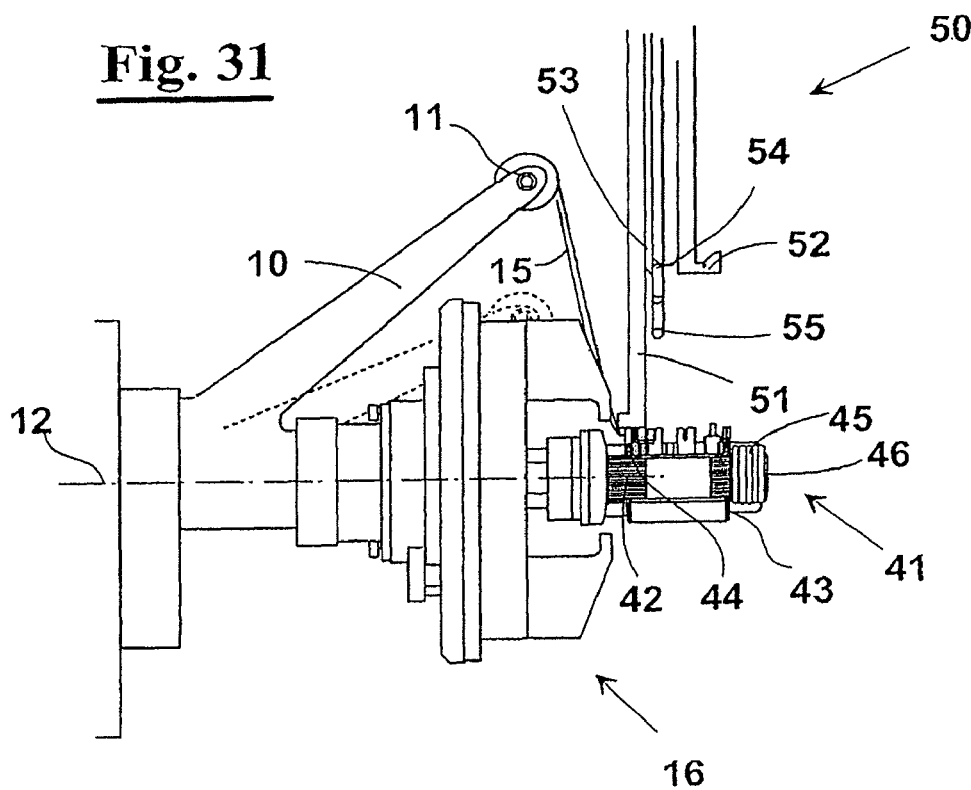

Then, as shown in FIG. 30, the shroud 16 is approached to the stator and is ready for winding. In this step, an end 45' of wire 15 is kept pressed against the inner face of terminal 44 from the lower extremity of first deflector 51, so that winding can start and, when spooling the first coils (FIG. 31), the tension of the wire 15 cannot pull out an end 45' from the terminal 44. At winding (FIG. 32), moreover, the first deflector 21 moves up.

Figure 33:
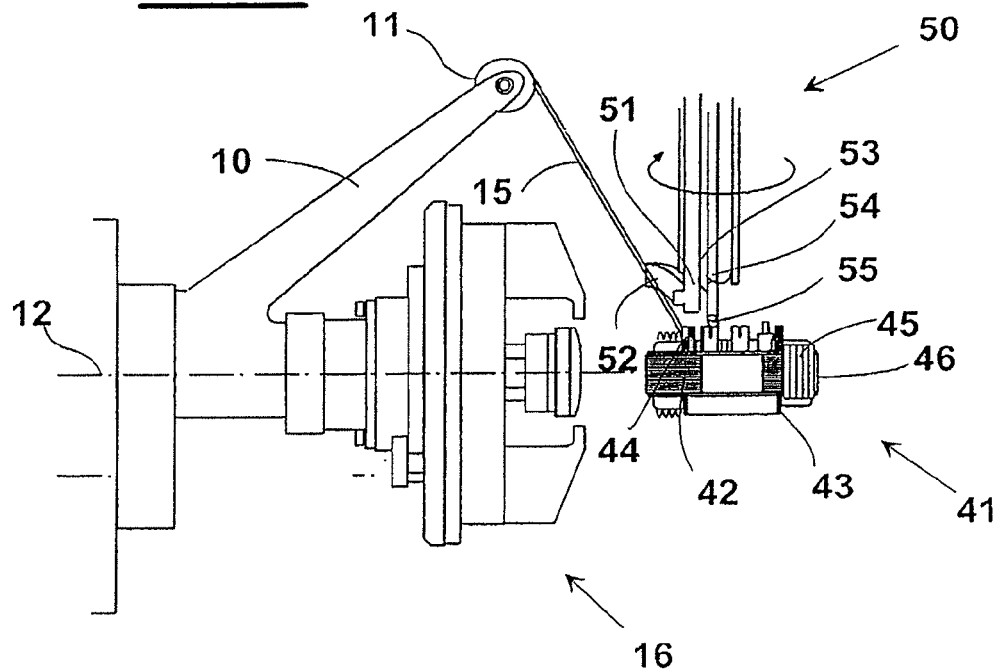

At the end of winding, the shroud withdraws, and the stator, in a way not shown, is subject to an index movement for winding a pole different from that already wound. The wire, in this step, is not cut. Winding starts again, and eventually the shroud 16 withdraws again (FIG. 33). The wire 15 that is stretched between the flyer 10 and the stator 41 has to be cut and terminated in the respective terminal 44.

Figure 34:
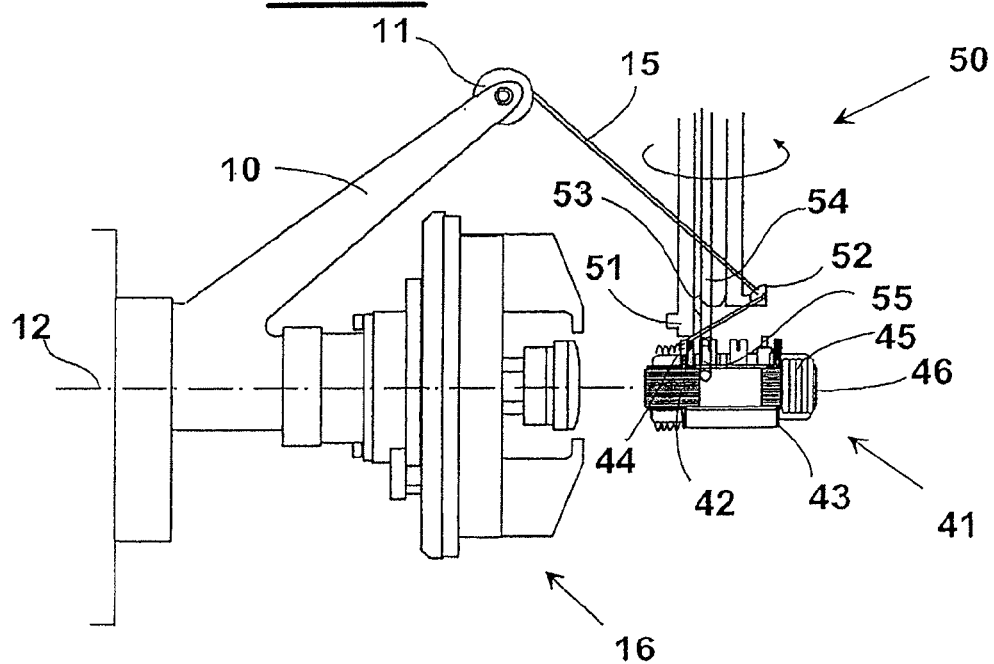

Before this, device 50 is lowered, with grippers 54-55 open and second deflector 52 rotated about the axis 57 to the side that is oriented towards the shroud 16, in order to engage wire 15. A movement of flyer 10 can make this step easier. Second deflector 52 then rotates (FIG. 34) and stops when the wire is aligned with terminal 44 and has entered grippers 54-55.

Figure 35:
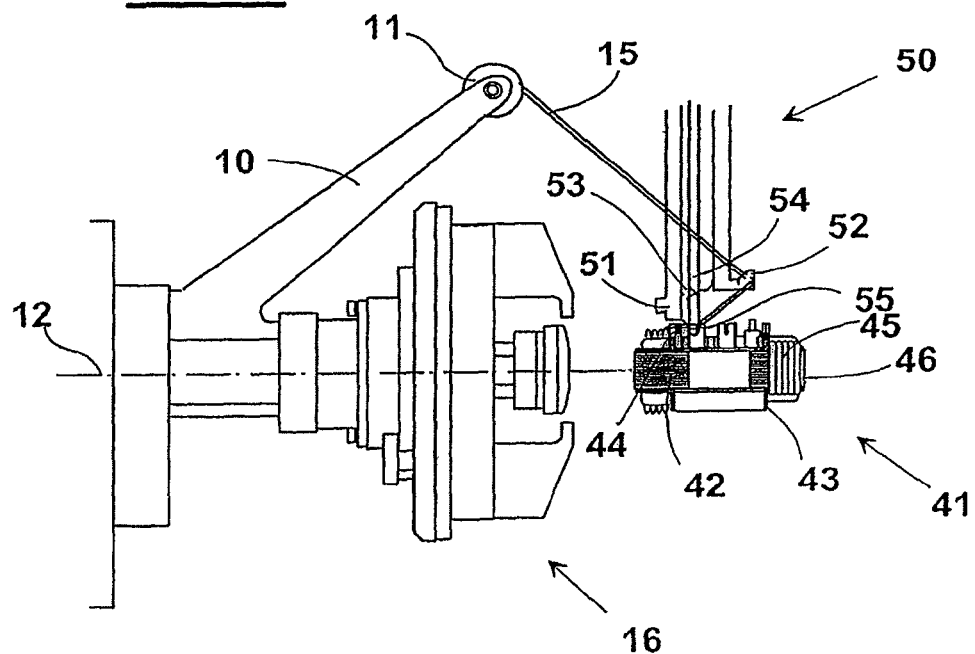

Then (FIG. 35) flyer 10 is lowered that causes the wire to enter the terminal 44, and, at the same time, blade 52 cuts the wire between grippers 54-55 and terminal 44, so that an end 45" is cut close to terminal 44 and the other cut end of wire 15 remains with grippers 54-55.

Figure 36:
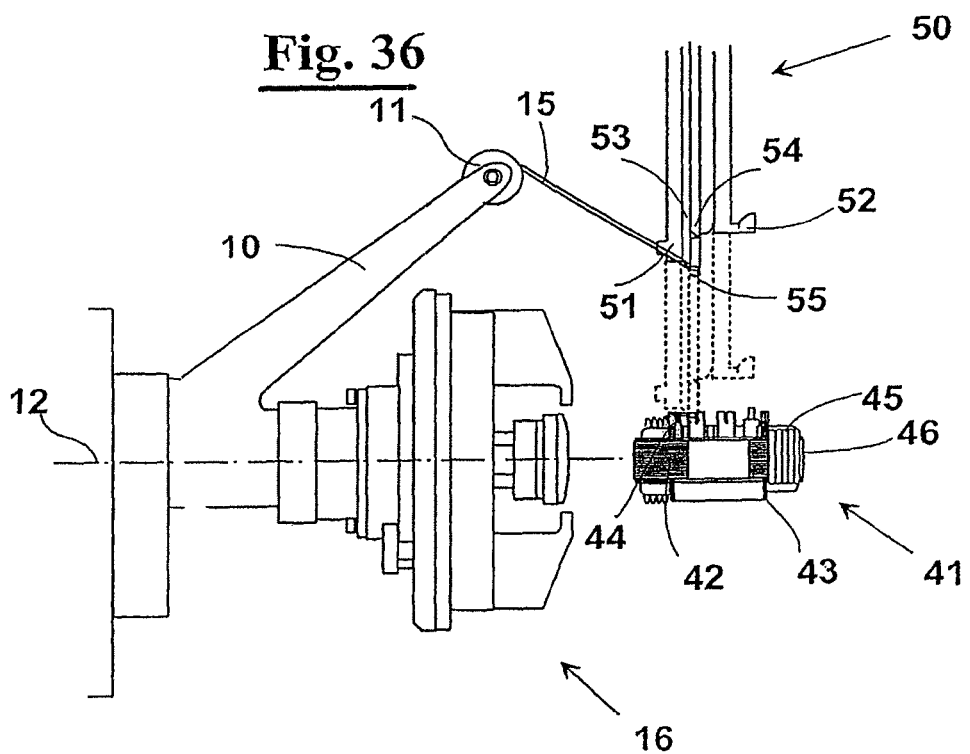

Finally, FIG. 36, the device 50 moves up again, back to the position of FIG. 45, with stator 41 wound of other coils 45 about the respective poles 46, and the ends 45' and 45" inserted into the respective terminals 44. The deflector 52 rotates in a way not shown for returning the wire in the position of FIG. 23.

The foregoing description of a specific embodiment will so fully reveal the invention according to the conceptual point of view, so that others, by applying current knowledge, will be able to modify and/or adapt for various applications such embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. A method for lead wire termination on outwardly spooled multi-pole stators,
    wherein the multi-pole stators are formed by a core of ferromagnetic sheets, having an axis and a plurality of polar extensions that extend radially to define poles having grooves between them, and by a terminal board that covers in part the core and has a plurality of terminals,
    wherein the lead wire is wound about said plurality of poles distributed by a flyer and guided by shrouds that move radially during winding with respect to the multi-pole stators, overlapping the respective polar extension, and wherein, before and/or after winding, wire termination operations are provided for the wire ends in said terminals with the aid of said flyer, said termination operations comprising the steps of catching, moving, introducing into the terminals and cutting a portion of wire, characterised in that said steps of catching, moving, introducing and cutting said portion of wire occur by means of a single multifunctional instrument, separate from said flyer, having an instrument axis parallel to the axis of the stator, capable of carrying out a plurality of movements parallel to and/or rotations about said instrument axis, and including a clamp having at least one gripper portion that translates relative to the single multifunctional instrument in a direction parallel to the axis of the single multifunctional instrument, and a deflector separate from the clamp that translates relative to the single multifunctional instrument in a direction parallel to the axis of the single multifunctional instrument.

2. The method according to claim 1, wherein the instrument axis is incident to the stator.

3. The method according to claim 1, wherein said step of introducing said wire comprises, before starting a winding step, a step of creating a bridge of wire between said clamp and said deflector, and a step of introducing the wire bridge in the terminal by translating said single multifunctional instrument relative to said stator to translate said bridge relative to the stator parallel to said axis of the stator.

4. The method according to claim 3, wherein said step of creating the bridge can be carried out by rotating the clamp and the deflector about said instrument axis.

5. The method according to claim 1, wherein said step of cutting the wire is carried out by bringing a blade parallel to said axis of the stator up to intersecting said wire, kept by a clamp.

6. The method according to claim 1, wherein said step of cutting the wire is associated with a movement of folding the portion of cut wire protruding from a terminal to bend along a terminal side before the start of winding.

7. The method according to claim 6, wherein said portion of cut wire bent along the terminal side is kept pressed against the terminal at least during a first phase of winding of said poles to secure the wire in the terminal.

8. The method according to claim 7, wherein when the terminal is arranged peripherally on one of the polar extensions, the portion of cut wire is kept pressed elastically by an element associated to the shroud that extends from the shroud in a direction orthogonal to said axis of the stator.

9. The method according to claim 1, wherein said step of catching the wire, occurring after a portion of wire is stretched between said flyer and a spooled coil, is carried out by translating said clamp parallel to said instrument axis up to a predetermined position, opening said clamp, rotating the flyer until said stretched wire portion does not intersect said predetermined position, and closing said clamp.

10. The method according to claim 1, wherein a step is provided of bringing said portion of wire to said predetermined position by a protruding element that rotates coaxially to said clamp and engages said portion of wire.

* * * * *